(12) United States Patent
Yavas et al.

(10) Patent No.: US 12,299,549 B1
(45) Date of Patent: May 13, 2025

(54) SYSTEMS AND METHODS FOR USING AN ARTIFICIAL INTELLIGENCE DECISION ENGINE TO EXTEND THE LIFESPAN OF BATTERIES

(71) Applicant: EATRON TECHNOLOGIES LIMITED, Warwick (GB)

(72) Inventors: Muharrem Ugur Yavas, Istanbul (TR); Can Kurtulus, Istanbul (TR); Ali Ibrahim Ozkan, Istanbul (TR)

(73) Assignee: Eatron Technologies Limited, Warwick (GB)

( * ) Notice: Subject to any disclaimer, the term of this patent is extended or adjusted under 35 U.S.C. 154(b) by 0 days.

(21) Appl. No.: 18/894,703

(22) Filed: Sep. 24, 2024

(51) Int. Cl.
*G06Q 10/20* (2023.01)
*G06N 20/00* (2019.01)
*G06N 20/20* (2019.01)

(52) U.S. Cl.
CPC ............. *G06N 20/00* (2019.01); *G06N 20/20* (2019.01); *G06Q 10/20* (2013.01)

(58) Field of Classification Search
None
See application file for complete search history.

(56) References Cited

U.S. PATENT DOCUMENTS

| | | | |
|---|---|---|---|
| 10,680,294 B2 * | 6/2020 | Ferran | H01M 10/44 |
| 2013/0221928 A1 * | 8/2013 | Kelty | B60L 58/13 |
| | | | 320/134 |
| 2023/0237445 A1 * | 7/2023 | McKinley | G06Q 10/20 |
| | | | 705/305 |
| 2024/0177056 A1 * | 5/2024 | Zou | G06N 20/00 |

OTHER PUBLICATIONS

Sharifi, Pouya, Amarnath Banerjee, and Mohammad J. Feizollahi. "Leveraging owners' flexibility in smart charge/discharge scheduling of electric vehicles to support renewable energy integration." Computers & Industrial Engineering 149. (2020): 106762. 12 pages. (Year: 2020).*

(Continued)

*Primary Examiner* — Vincent Gonzales
(74) *Attorney, Agent, or Firm* — Dickinson Wright PLLC; Jonathan H. Harder

(57) ABSTRACT

In one aspect, a computer-implemented method for executing an artificial intelligence (AI) engine, including executing a categorization model configured to categorize, into categories, vehicles based on factors comprising age, temperature conditions, usage patterns, battery health metrics, or some combination thereof, executing a behavior analysis model configured to analyze behavior of the vehicles in each of the categories to identify battery performance metrics including charging habits, discharge rates, charge rates, state of charge, state of health, state of power, or some combination thereof, executing a recommendation generation model configured to generate, based on the battery performance metrics, recommendations for enhancing battery management strategies, wherein the recommendation generation model accounts for a current state of a vehicle to suggest actions to improve battery health; and executing a battery model configured to determine power and energy consumption based on the recommendations generated by the recommendation generation model.

20 Claims, 21 Drawing Sheets

(56) References Cited

OTHER PUBLICATIONS

Geerts, David, Robinson Medina, Wilfried van Sark, and Steven Wilkins. "Charge Scheduling of Electric Vehicle Fleets: Maximizing Battery Remaining Useful Life Using Machine Learning Models." Batteries 10, No. 2 (2024): 60. Published Feb. 15, 2024. 19 pages. (Year: 2024).*

Wu, Billy, W. Dhammika Widanage, Shichun Yang, and Xinhua Liu. "Battery digital twins: Perspectives on the fusion of models, data and artificial intelligence for smart battery management systems." Energy and AI 1 (2020): 100016. (Year: 2020).*

Al-Doori, Moath, Daniel Paluszczyszyn, David Elizondo, Benjamin Passow, and Eric Goodyer. "Range extended for electric vehicle based on driver behaviour." (2014): 2-3. (Year: 2014).*

Al-Doori.*

Wu.*

* cited by examiner

SYSTEMS AND METHODS FOR USING AN ARTIFICIAL INTELLIGENCE DECISION ENGINE TO EXTEND THE LIFESPAN OF BATTERIES

TECHNICAL FIELD

This disclosure relates generally to assets and batteries. More specifically, this disclosure relates to systems and methods for using an artificial intelligence decision engine to extend the lifespan of assets and batteries.

BACKGROUND

Many industries involve assets that age and reach End of Life (EOL) states where they are no longer useful. One such example includes energy storage solutions that are prevalent in many assets including personal laptops, mobile phones, electronic watches, rings, and other wearable devices. Further, assets including gate valves used in nuclear reactor control systems, turbofan engines, solid state disks, and other industrial applications are valuable and have limited useful lifetimes. Each asset and/or battery may be prone to degradation issues.

In one example, among various energy storage solutions, Lithium-ion (Li-ion) batteries are widely regarded as promising candidates for various applications due to their advantages of high energy density and low self-discharge. However, the life span of Li-ion batteries is not unlimited, and the cost and aging of Li-ion batteries may be two main factors hindering their development. The performance of Li-ion batteries degrades with time (calendar aging) and use (cycle aging), which is referred to as the aging phenomenon. The aging of the battery may increase operating costs, reduce the service life of the equipment, and affect the safe operation of the equipment.

Moreover, there may not be an ideal solution for recycling of Li-ion batteries. Predictive maintenance may enable mechanisms to be in place for handling of batteries before they reach their EOL reducing demands on recycling. Additionally, premature failures of the batteries may increase demands on re-cycling. Generally, when battery capacity drops below a target threshold i.e. 70-80% of initial battery capacity for an automotive-grade battery, the battery may have reached the end of its service life. The target threshold may vary between different applications.

When Li-ion battery is being charged or discharged, lithium ions move between the negative electrode and the positive electrode. In certain temperatures (e.g., cold) and fast-charging situations, the lithium ions can begin to deposit on the surface of the negative electrode, forming a layer of lithium metal. This phenomenon may be referred to as "lithium plating," which may greatly reduce the battery's lifespan and hinder its fast-charging capabilities. In severe cases, lithium plating may cause short circuits.

SUMMARY

In one aspect, a computer-implemented method may include determining a state of health (SOH) degradation rate for a battery pack. The SOH degradation rate indicates how quickly the battery pack is aging. The method may include determining an average operating temperature of the battery pack, and responsive to determining that the SOH degradation rate exceeds a SOH degradation rate threshold (indicating that the battery is aging faster than normal), a SOH value is below a pre-defined SOH value, and the average operating temperature exceeds a threshold temperature, identifying the battery pack as an over-aged battery pack candidate for exchange. The method may include pairing the over-aged battery pack candidate with an under-aged battery pack and determining whether the average operating temperature of over-aged pack is higher than an ambient temperature of the under-aged battery pack; and generating one or more instructions to exchange one or more first battery cells of the over-aged battery pack candidate with one or more second battery cells of the under-aged battery pack.

In one aspect, a computer-implemented method may include executing an artificial intelligence (AI) engine, comprising executing, by the AI engine, a categorization model configured to categorize, into a plurality of categories, a plurality of vehicles based on a plurality of factors comprising age, temperature conditions, usage patterns, battery health metrics, state of charge (SOC), charge rate, discharge rate (vehicle speed), or some combination thereof. The method may include executing, by the AI engine, a behavior analysis model configured to analyze behavior of the plurality of vehicles in each of the plurality of categories to identify battery performance metrics comprising charging habits, discharge rates, charge rates, or some combination thereof. The method may include executing, by the AI engine, a recommendation generation model configured to generate, based on the battery performance metrics, a plurality of recommendations for enhancing battery management strategies, wherein the recommendation generation model accounts for a current state of a vehicle to suggest actions to improve battery health. The method may include executing, by the AI engine, a battery model configured to determine power and energy consumption based on the one or more recommendations generated by the recommendation generation model.

In one aspect, a computer-implemented method may include executing, by an AI engine of a cloud-based computing system, a recommendation generation model configured to generate, based on battery performance metrics, a plurality of recommendations for enhancing battery management strategies of a fleet of vehicles. The method may include receiving, at an edge-based processor, a state of health of a battery pack of a vehicle. Based on the state of health of the battery pack of the vehicle, the method may include categorize a battery age of the vehicle. Based on a plurality of ambient temperatures, the method may include categorizing an ambient temperature of the vehicle. Based on the battery age of the vehicle, the ambient temperature of the vehicle, and the plurality of recommendations, the method of may include selecting a filtered subset of the plurality of recommendations, and the method may include transmitting the filtered subset.

In one aspect, a computer-implemented method may include generating, using an artificial intelligence (AI) recommendation generation engine, one or more recommendations to modify an aspect of a battery's health. The method may include transmitting the one or more recommendations to a battery model and a neural remaining useful life model representing an environment. Based on at least the one or more recommendations, The method may include receiving, from the battery model, a performance related reward associated with the one or more recommendations impact on degradation rate, cycle life, energy efficiency, or some combination thereof. Based on at least the one or more recommendations, the method may include receiving, from the neural remaining useful life model, a battery life related reward associated with long-term impact of the one or more recommendations on battery lifespan. Based on the performance related reward and the battery life related reward, the method may include modifying one or more hyperparameters of the AI recommendation generation engine.

In another aspect, a tangible, non-transitory computer-readable medium may store instructions and a processing device may execute the instructions to perform one or more operations of any method disclosed herein.

In another aspect, a method may include one or more operations implemented by computer instructions and performed by one or more processing devices to perform the techniques disclosed herein.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, independent of whether those elements are in physical contact with one another. The terms "transmit," "receive," and "communicate," as well as derivatives thereof, encompass both direct and indirect communication. The terms "transmit," "receive," and "communicate," as well as derivatives thereof, encompass both communication with remote systems and communication within a system, including reading and writing to different portions of a memory device. The terms "include" and "comprise," as well as derivatives thereof, mean inclusion without limitation. The term "or" is inclusive, meaning or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "translate" may refer to any operation performed wherein data is input in one format, representation, language (computer, purpose-specific, such as drug design or integrated circuit design), structure, appearance or other written, oral or representable instantiation and data is output in a different format, representation, language (computer, purpose-specific, such as drug design or integrated circuit design), structure, appearance or other written, oral or representable instantiation, wherein the data output has a similar or identical meaning, semantically or otherwise, to the data input. Translation as a process includes but is not limited to substitution (including macro substitution), encryption, hashing, encoding, decoding or other mathematical or other operations performed on the input data. The same means of translation performed on the same input data will consistently yield the same output data, while a different means of translation performed on the same input data may yield different output data which nevertheless preserves all or part of the meaning or function of the input data, for a given purpose. Notwithstanding the foregoing, in a mathematically degenerate case, a translation can output data identical to the input data. The term "controller" means any device, system or part thereof that controls at least one operation. Such a controller may be implemented in hardware or a combination of hardware and software or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable storage medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable storage medium" includes any type of medium capable of being accessed by a computer, such as read only memory (ROM), random access memory (RAM), a hard disk drive, a compact disc (CD), a digital video disc (DVD), solid state drive (SSD), or any other type of memory. A "non-transitory" computer readable storage medium excludes wired, wireless, optical, or other communication links that transport transitory electrical or other signals. A non-transitory computer readable storage medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

Figure 1:
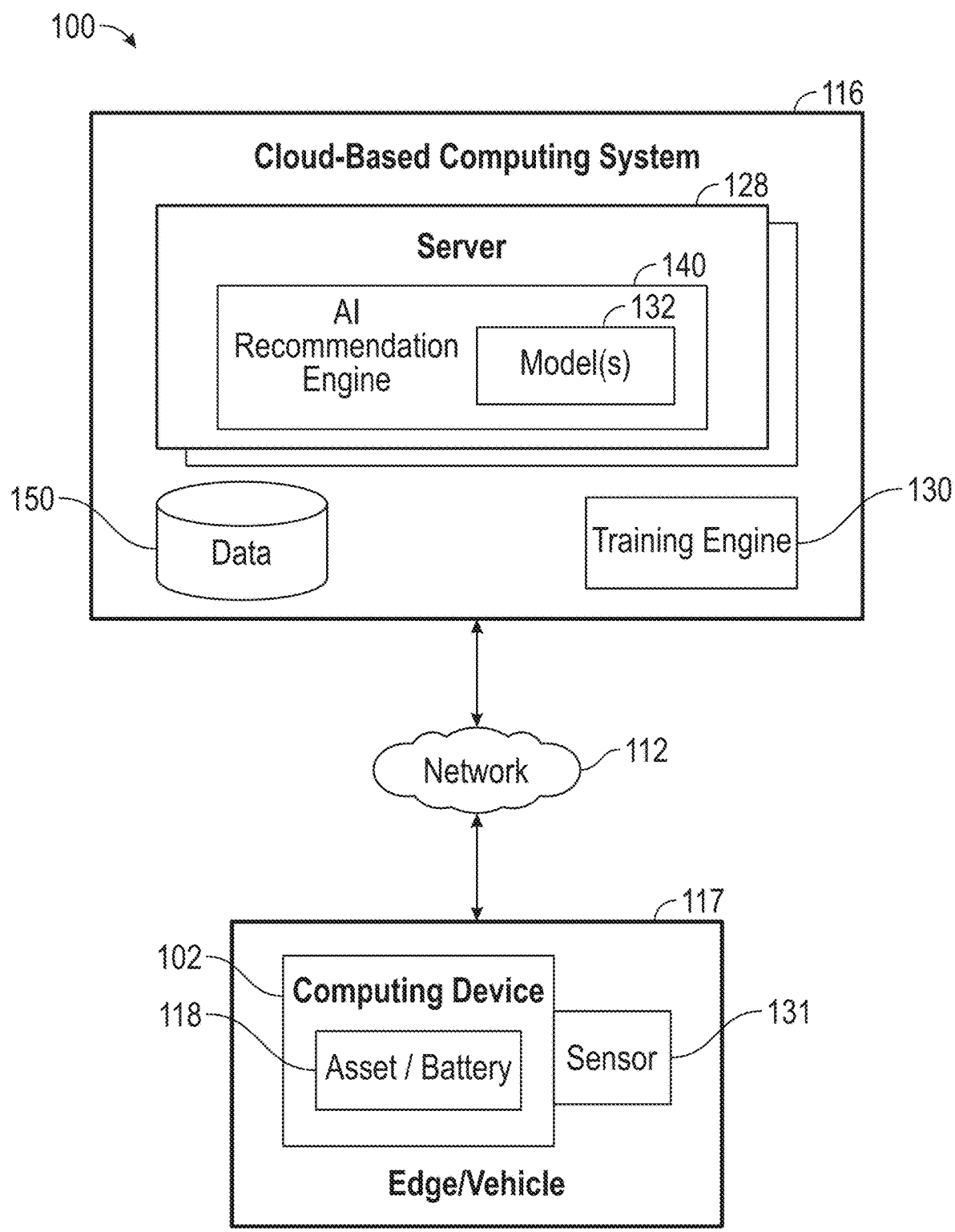
FIG. 1 illustrates a high-level component diagram of an illustrative system architecture according to certain embodiments of this disclosure.

As reliance on battery-powered devices and systems increases, from electric vehicles and renewable storage to consumer electronics and wearable computing devices, a technical problem exists with regard to increasing the battery lifetime and fast charging of batteries.

As described further herein, the disclosed embodiments may provide a technical solution by using a combination of models to detect certain conditions of the battery packs and make recommendations to alter operating parameters of a vehicle to enhance the lifetime of the battery and/or charging profile. In some embodiments, operating parameters of a battery pack and/or electric vehicle may be dynamically controlled via one or more processors to modify a charging policy of the battery pack, speed of the electric vehicle, or the like.

Battery packs are made up of multiple interconnected cells, supercells, and modules. The cells are usually connected in parallel to create supercells. Supercells have the same voltage of a single cell but they are more powerful in terms of capacity measured in Ampere Hours (AH). Commonly voltage sensors reside at supercell level. Series connections increase voltage, while parallel connections increase capacity (measured in Ampere Hours, AH). Supercells are usually connected in series to form modules to achieve desired voltage output. Modules usually have temperature sensors. In some cases, single temperature sensor may monitor multiple modules. The exact module configuration may vary depending on the specific electrical and cooling requirements of the application. Modules are then connected in series and/or in parallel to create a pack with required voltage, current, power and cooling requirements. Usually, current sensors reside at pack level. Packs will typically have additional components such as current limiters, liquid coolers and/or heaters to protect it from harsh environmental conditions. Efficient temperature maintenance in large battery structures may be essential. Most electrical vehicle (EV) batteries have specialist temperature maintenance systems in place. Smaller battery systems typically will have efficient cooling systems. Some high-performance battery systems require sophisticated temperature management. In summary battery temperature management systems may be an important part of their maintaining performance and extending their lifespan.

Optimal Temperature Range for Lithium batteries is between 15° C. (59° F.) to 35° C. (95° F.). At temperatures below 15° C. (59° F.), chemical reactions within the battery slow down, resulting in decreased power output. Conversely, temperatures above 35° C. (95° F.) can lead to overheating, which harms battery health and reduces lifespan. Freezing temperatures below (0° C. or 32° F.) can freeze the battery's electrolyte, causing permanent damage. Controlled environments and thermal management systems may help maintain desired battery temperatures. EVs may include sophisticated cooling and heating systems. Therefore, EVs can be used in different environmental conditions. Similarly smaller equipment such as cell phones, home equipment have efficient cooling systems to ensure battery temperature is maintained at optimal levels. Regular temperature monitoring prevents damage and ensures battery safety and longevity.

In some embodiments of this disclosure, ambient temperature is categorized at different ranges as: (i) hot condition: if the ambient temperature exceeds 35 degrees Celsius, it falls into the "hot" category, (ii) warm condition: if the average temperature of the ambient is between 15 and 35 degrees Celsius, it is classified as being in a "warm" condition, and cold condition: if the ambient temperature of the battery is below 15 degrees Celsius, it is categorized as being in a "cold" condition. It should be noted that 15 and 35 degrees are example values and might slightly differ in a fleet operation.

Some embodiments of this disclosure automatically adjusts or offers guidance for charging and discharging speeds in different temperature categories. For example a charge control unit, including a processing device, may transmit control instructions to charge a battery and discharge a battery at different speeds in the different temperature categories. In some embodiments, the temperature ranges described here are temperature of the environment, not the battery. In some embodiments, maintaining the battery in a temperature range is one of the tasks of a battery thermal management system. Further, categorizing batteries based on environmental temperature may provide several benefits for several reasons. Firstly, environmental temperature may directly influence battery performance and longevity. Extreme temperatures, whether hot or cold, may negatively impact battery efficiency and lifespan. For instance, high temperatures may accelerate chemical reactions within the battery, leading to faster degradation, while cold temperatures may decrease battery efficiency and capacity.

Even though battery thermal management systems may aim to keep the battery within its optimal temperature range, they also consume energy. Moreover, when the vehicle is not in use (ignition off), the battery temperature may align with the ambient temperature as the thermal management system is inactive. This reliance on ambient temperature during idle periods means that battery performance can still be affected by external temperature variations, especially during extreme conditions like winter. Therefore, some embodiments of this disclosure may manage the relationship between environmental temperature and battery performance for optimizing battery longevity and performance.

Further, state of health (SOH) represents the total available charged capacity of the battery as a percentage compared to its nominal capacity when it was new. It considers cell aging and provides insights into the battery's overall health. It may be calculated by below formula $$SOH(\%) = (Qmax/Cr) \times 100$$

Where; maximum charge (Qmax) is the maximum charge available in the battery. Rated capacity (Cr) or namely nominal capacity is the capacity specified by the manufacturer when the battery was new. As a battery ages, its capacity fades, its resistance increases and SOH decreases. SOH represents the difference between the current state of a battery and a fresh, new battery. The SOH of a lithium-ion battery may be an important parameter that directly impacts the operation and performance of these batteries, especially in electric vehicles. Over time, batteries experience physical and chemical changes due to discharge, charging, temperature variations, and other factors. These changes collectively contribute to battery aging. Common aging mechanisms include: (i) charging/discharging C-Rate: fast charging and discharging at high C-rates generally have a negative impact on the SOH of batteries, (ii) state of charge (SOC) operation window: spending excessive time at high SOCs (>80%) and low SOCs (<20%) may negatively impact SOH, and (iii) calendar aging: even when not in use, batteries age due to chemical reactions.

Various SOH estimation methods may include: (i) electrochemical impedance spectroscopy (EIS): analyzing impedance behavior at different frequencies, (ii) Coulomb counting method: tracks the amount of charge (in coulombs) entering and leaving the battery during charge and discharge cycles, (iii) open circuit voltage (OCV) based method: uses the relationship between OCV and the SOC to estimate SOH.

Model based approaches may include (i) equivalent circuit models (ECMs), (ii) electrochemical models, (iii) extended Kalman filter (EKF), (iv) machine learning model algorithms using historical data, (v) artificial neural Networks (ANNs), (vi) long short-term memory (LSTM), and (vii) convolutional neural networks (CNNs).

Each method has its advantages and limitations. A new battery typically has an SOH of 100%. As battery ages, its capacity diminishes gradually, resulting in lower SOH.

Some embodiments of the present disclosure categorize batteries as follows: (i) fresh: if the battery's SOH is greater than 94%. it falls into the "fresh" category. (ii) middle-aged: if the battery's SOH is between 85% and 94%, it is classified as "middle-aged", and (iii) aged: if the battery's SOH is less than 85%, it is labeled as "aged".

SOH estimates may be relied upon to make other estimates such as remaining useful life (RUL) of a battery pack. It should be noted that 85% and 94% are example values and might slightly differ in a fleet operation.

State of charge (SOC) quantifies the remaining capacity available in a battery at a given time and in relation to a given state of aging. It is usually expressed as a percentage, where 0% represents an empty battery, and 100% indicates a fully charged battery. An alternative measure related to SOC is the depth of discharge (DOD), which is calculated as (1-SOC). 100% DOD represents an empty battery, and 0% DOD represents a full battery.

SOC represents how much energy remains in the battery relative to its fully charged current capacity. If a battery has a 50% SOC, it means it has used up 50% of its total energy capacity. For example, in an EV, the SOC indicates the remaining energy in the battery pack. It may serve as the equivalent of a fuel gauge, helping EV owners track charging progress and estimate when the vehicle will be ready for use.

Experimental data indicates that when considering battery aging from different driving patterns within a DOD range of 20% to 80%, the lifetime expectancy of vehicle batteries may increase by 44-130%. Additionally, when accounting for calendar aging, which plays a role in total battery aging, keeping the battery at or around 15% SOC during parking and minimizing the time spent at very low or very high SOC can reduce the impact of calendar aging. In some embodiments, desired SOC range of 20% low, 80% high appears to extend the battery lifespan.

In some battery management systems (BMS), state of power (SOP) is a software function that may determine and publish "available" charge. SOP may also publish discharge power (or current/voltage) limits (e.g. instantaneous and/or peak) over with one or more defined time horizon(s) such as 2 seconds(s), 10s, 30s, 60s etc.) to enhance performance availability, and lifetime of a battery. These calculations are based on current operating conditions such as ambient/battery temperature(s), state-of-charge, voltage and temperature of the cells and/or battery pack, C-rate/pack current, limits on these current operating conditions (upper and lower limits on cell/pack voltage, temperatures, pack current and cell/pack SOC) recent or predicted battery pack current/power, state of the battery pack (whether it is charging, discharging/use or in a "sleep" i.e., inactive, mode), any existing or potential battery errors and faults etc.

The SOP function may be responsible for implementing a charging policy of a battery by publishing the relevant charge power (or current/voltage) limits to the external charger.

The SOP determination itself corresponds to a nonlinear function which maps the input signals such as listed above to the available instantaneous power over the defined horizon(s). Various methods could be used to implement this function such as constrained (with hard or soft constraints) optimization, optimal control linear quadratic regulator (LQR), linear quadratic gain (LQG), generalized predictive control (GPC), dynamic matrix control (DMC), model predictive control (MPC) (with hard or soft constraints, nonlinear, linearized or linear, robust, implemented as a version of a quadratic program), internal model control (IMC), various flavors of PID Control, bisection search in combination with the model of battery, reinforcement learning (RL), model based (deep) reinforcement learning (DRL), etc.

The C-rate of a battery refers to the rate at which it is charged or discharged relative to its capacity. Specifically, a 1C rate means that the discharge current will completely discharge the entire battery in 1 hour. A battery with a capacity of 1 Ah discharging at 0.5C should provide 500 mA for two hours. When discharging at 2C, it delivers 2A for 30 minutes. Losses at fast discharges reduce the discharge time and these losses also affect charge times.

A C-rate of 1C is also known as a one-hour discharge; 0.5C or C/2 is a two-hour discharge and 0.2C or C/5 is a 5-hour discharge. Some high-performance batteries can be charged and discharged above 1C with moderate stress.

By discharging the 1 Ah battery at the faster 2C-rate, or 2A, the battery should deliver the full capacity in 30 minutes. The sum should be the same since the identical amount of energy is dispensed over a shorter time. In reality, internal losses may turn some of the energy into heat and lower the resulting capacity to about 95% or less. Optimal C-rate depends on the specific battery chemistry, application, and desired trade-offs between capacity and performance.

C-rate in discharge is related to EV speed. Higher speeds can indirectly impact battery performance due to increased power demands. For instance, electric vehicles operating at higher speeds may require more power from the battery, affecting the C-rate during acceleration or sustained high-speed driving. The relationship between speed and discharge current may not be linear but rather dynamic, as it depends on various factors such as vehicle weight, aerodynamics, road conditions, and driving behavior. Changes in average speed, whether increased or decreased, may alter the load of discharge current on the battery, thereby affecting its lifespan.

Some embodiments of the present disclosure generates recommendations based on C-rates and currents. To warn the user about discharge current, some embodiments provide alerts based on speed using recorded values of C-rate versus speed, ensuring the user can directly understand the implications.

Battery management systems (BMS) may monitor current, voltage, temperature and cells. A BMS may calculate SOH. SOC, estimates error levels, balances cells and controls charging and discharging. BMS may also manage data display and connection with the charger.

Typical BMS acts on limited resources and data at the edge. It does not have the benefit larger fleet data, nor does it use historical data. Focus of BMS is to maintain safety at the edge with limited resources.

Lifespan and safe operation of a battery pack is influenced by several factors such as charge/discharge c-rates, average operational temperature over time, SOH, SOC, User (Driver) charging behaviour, and historical usage patterns. For example; charging a Fresh battery (>94% SOH) up to 80% SOC and not discharging it below 20% SOC and maintaining average operating temperature Warm (>15C<35C) may prolong battery lifespan>170%. This lifespan estimate may even be increased further by limiting charging and discharging c-rates. When battery's historical data is taken into account, a better SOC target could be estimated. As this simple example demonstrates increasing lifespan of a battery is a complex and dynamic process depending on current and historical data.

Some embodiments deploy fleet wide data for estimating remaining useful life (RUL) and allows an artificial intelligence (AI) model to make recommendations on driving and/or using the battery. RUL and AI recommendations may be continuously updated using current and historical fleet wide data making the recommendations even more accurate as time goes by. "Continuous learning" may lead to highly accurate recommendations for users.

Further, the AI model may make recommendations that are implemented dynamically by a charge control unit that modifies a charging profile of a battery pack of an EV.

Some embodiments of the present disclosure may increase lifespan of a battery, in some cases 3-fold increase in lifespan. Some embodiments may result in SOH remaining fresh in category for much longer, in some instances tripling period in fresh category. Some embodiments may result in flexible recommendations allowing user choice. Further, some embodiments may result in highly accurate recommendations achieved through continuous learning.

Users of rechargeable batteries, in some cases drivers, face different challenges when using EVs, mobile phones, home gadgets. Some embodiments may allow divergence from "ideal" usage. Periods of use patterns that negatively influence battery lifespan is also taken into account when new recommendations are generated.

Some embodiments are applicable to existing li-ion battery technologies and chemistries, including not widely commercialized ones such as solid state, or semi-solid-state batteries, batteries with li-metal anodes instead of carbon or silicon (Si) based anodes (graphite, hard carbon and any combination of these with Si, as well as pure Si). In addition to li-ion batteries, some embodiments are also applicable to metal ion batteries with a similar structure and working mechanism such as Na-ion batteries where instead of lithium, sodium will plate on the electrodes.

In some embodiments, the disclosed subject matter provides a technical solution to a technical problem of detecting lithium plating that occurs with one or more batteries. Some embodiments may use a supervised learning method as a technical solution to the lithium plating detection problem. The proposed solution may be applied to different kinds of batteries, whether they are big or small, such as smartphones or electric vehicle batteries. The disclosed embodiments may be applicable to full batter pack replacement and/or individual battery cell replacement. Total replacement of a battery pack may be very expensive and may be undesirable to a manufacturer. Thus, the disclosed techniques may enable diagnosing battery cells individually within a battery pack and may enable replacing those individually diagnosed cells and/or changing those individually diagnosed cells.

FIGS. 1 through 21, discussed below, and the various embodiments used to describe the principles of this disclosure are by way of illustration only and should not be construed in any way to limit the scope of the disclosure.

FIG. 1 illustrates a high-level component diagram of an illustrative system architecture 100 according to certain embodiments of this disclosure. In some embodiments, the system architecture 100 may include a cloud-based computing system 116, a computing device 102, and an edge/vehicle 117 communicatively coupled via a network 112. The term edge and vehicle may be used interchangeably herein. The cloud-based computing system 116 may be a real-time software platform, include privacy software or protocols, or include security software or protocols. Each of the computing device 102 and components included in the cloud-based computing system 116 may include one or more processing devices, memory devices, or network interface cards. The network interface cards may enable communication via a wireless protocol for transmitting data over short distances, such as Bluetooth, ZigBee, NFC, etc. Additionally, the network interface cards may enable communicating data via a wired protocol over short or long distances, and in one example, the computing device 102 and/or the cloud-based computing system 116 may communicate with the network 112. Network 112 may be a public network (e.g., connected to the Internet via wired (Ethernet) or wireless (WiFi)), a private network (e.g., a local area network (LAN) or wide area network (WAN)), or a combination thereof. In some embodiments, network 112 may also comprise a node or nodes on the Internet of Things (IoT).

The computing device 102 may be any suitable computing device, such as an embedded computer device with display, a laptop, tablet, smartphone, wearable device, or computer. The computing device 102 may be included within a vehicle, such as an electric vehicle. The computing device 102 may include a display capable of presenting a user interface of an application. The application may be implemented in computer instructions stored on the one or more memory devices of the computing device 102 and executable by the one or more processing devices of the computing device 102. The computing device may include an asset and/or battery pack 118, each of which may have a useful life that degrades over time. The asset and/or battery pack 118 may be used to charge and power a vehicle (e.g., electric vehicle), smartphone, appliance, or any suitable device that uses a battery. In some embodiments, the asset and/or battery pack 118 may be included external to the computing device 102 but may be included in the vehicle 117 and communicatively coupled to the computing device 102 and/or cloud-based computing system 116.

The user interface may present various screens to a user that present various views including recommendations for charging the battery and/or guidance messages for users to follow. The user interface may enable performing a preventive action such as presenting a signal (e.g., warning signal that the battery life is low, charge level is low, etc.) and/or changing an operating parameter of the vehicle to consume less energy from the battery, and the like. The computing device 102 may also include instructions stored on the one or more memory devices that, when executed by the one or more processing devices of the computing device 102, perform operations of any of the methods described herein.

The vehicle 117 may be any suitable type of vehicle or electric vehicle, such as an automobile, a motorcycle, a boat, an airplane, a bicycle, a scooter, a skateboard, roller skates, roller blades, a unicycle, a surfboard, a drone, or the like. Accordingly, the vehicle may include an engine that is powered by one or more batteries, assets, and motors. The vehicle may also include one or more sensors 131 that are configured to measure any suitable operating parameter of a vehicle, a temperature of the vehicle 117, a vibration of the vehicle 117, a battery pack current, a battery pack cell voltage, a battery pack cell temperature, etc. The sensors 131 may include an accelerometer, a current sensor, a voltage sensor, a temperature sensor, a thermal sensor, a camera, or the like. The processing device of the vehicle 117 may receive the measurements from the one or more sensors 131 and transmit them via the network 112 to the cloud-based computing system 116 for use in training one or more models 132. The models may be implemented in computer instructions stored on one or more memory devices and executed by one or more processing devices. As described further herein, some embodiments execute a neural remaining useful life model, and various other types of models 132 executed by the AI recommendation engine 140. The terms AI engine, artificial intelligence engine, artificial intelligence recommendation engine, artificial intelligence decision engine, AI recommendation engine, AI-RE, and AI-DE may be used interchangeably herein. The vehicle 117 may also execute an instance of a model 132 that is trained using parameters received from a cloud-based model 132.

In some embodiments, the cloud-based computing system 116 may include one or more servers 128 that form a distributed computing system, which may include a cloud computing system. The servers 128 may be a rackmount server, a router, a personal computer, a portable digital assistant, a mobile phone, a laptop computer, a tablet computer, a camera, a video camera, a netbook, a desktop computer, a media center, any other device capable of functioning as a server, or any combination of the above. Each of the servers 128 may include one or more processing devices, memory devices, data storage, or network interface cards. The servers 128 may be in communication with one another via any suitable communication protocol. The servers 128 may execute the AI recommendation engine 140 and one or more models 132, as described further herein.

That is, the servers 128 may execute the AI recommendation engine 140 that uses one or more models 132 to perform at least one of the embodiments disclosed herein. Further, the server 128 may execute a neural remaining useful life model. The cloud-based computing system 116 may also include a database 150 that stores data, knowledge, and data structures used to perform various embodiments. For example, the database 150 may store fleet of electric vehicles' data, battery data (e.g., charging profiles, operational battery characteristics, SOH, SOC, SOP, battery performance metrics, user usage data, etc.) received from a manufacturer of the battery, lab experiment data pertaining to the battery, user battery usage profile, etc. Although depicted separately from the server 128, in some embodiments, the database 150 may be hosted on one or more of the servers 128.

In some embodiments, the cloud-based computing system 116 may include a training engine 130 capable of generating one or more models 132. Training engine 130 may use historical data from the database 150 to train a neural remaining useful life model and the AI recommendation engine 140 periodically. Retraining updates both the neural remaining useful life model and the AI recommendation engine 140 and makes them increasingly more accurate in their estimates and recommendations. Although depicted separately from the AI recommendation engine 140, the training engine 130 may, in some embodiments, be included in the AI recommendation engine 140 executing on the server 128. In some embodiments, the AI recommendation engine 140 may use the training engine 130 to generate the models 132, such as machine learning models, neural models, etc. trained to perform inferencing and/or predicting operations. The models 132, using data from database 150, may be trained to simulate battery operational scenarios, analyze usage patterns, generate charging recommendations, generate user guidance for discharge (in some cases related to speed), minimum SOC, generate instructions relating to the usage of the battery, predict a remaining useful life of a battery, among other things. The one or more models 132 may be generated by the training engine 130 and may be implemented in computer instructions executable by one or more processing devices of the training engine 130 or the servers 128. To generate the one or more models 132, the training engine 130 may train the one or more models 132. The one or more models 132 may be used by any of the methods described herein.

The training engine 130 may be a rackmount server, a router, a personal computer, a portable digital assistant, a smartphone, a laptop computer, a tablet computer, a netbook, a desktop computer, an Internet of Things (IoT) device, any other desired computing device, or any combination of the above. The training engine 130 may be cloud-based, be a real-time software platform, include privacy software or protocols, or include security software or protocols.

To generate the one or more models 132, the training engine 130 may train the one or more models 132. The training engine 130 may use a base training data set including inputs of labeled data (related data, BMS data, voltage, charge, SOC, SOH, SOP, etc.) and labeled output data (e.g., charge rate, discharge rate, minimum SOC, maximum SOC, recommendations, user guidance, recorded historical data, etc.), among other things. One or more combinations of the inputs may be mapped to an output pertaining to an occurrence of lithium plating of each cell of the battery pack.

The one or more models 132 may refer to model artifacts created by the training engine 130 using training data that includes training inputs and corresponding target outputs. The training engine 130 may find patterns in the training data wherein such patterns map the training input to the target output and generate the models 132 that capture these patterns. Although depicted separately from the server 128, in some embodiments, the training engine 130 may reside on server 128. Further, in some embodiments, the artificial intelligence recommendation engine 140, the database 150, or the training engine 130 may reside on the computing device 102.

As described in more detail below, the one or more models 132 may comprise, e.g., a single level of linear or non-linear operations (e.g., a support vector machine (SVM) or the models 132 may be a deep network, i.e., a machine learning model comprising multiple levels of non-linear operations. Examples of deep networks are neural networks, including generative adversarial networks, convolutional neural networks, recurrent neural networks with one or more hidden layers, and fully connected neural networks (e.g., each artificial neuron may transmit its output signal to the input of the remaining neurons, as well as to itself). For example, the machine learning model may include numerous layers or hidden layers that perform calculations (e.g., dot products) using various neurons. In some embodiments, the models 132 may perform linear algebra and/or differential equations to simulate various battery operational scenarios. In some embodiments, the one or more models 132 may be trained via supervised learning, unsupervised learning, and/or reinforcement learning.

Figure 2:
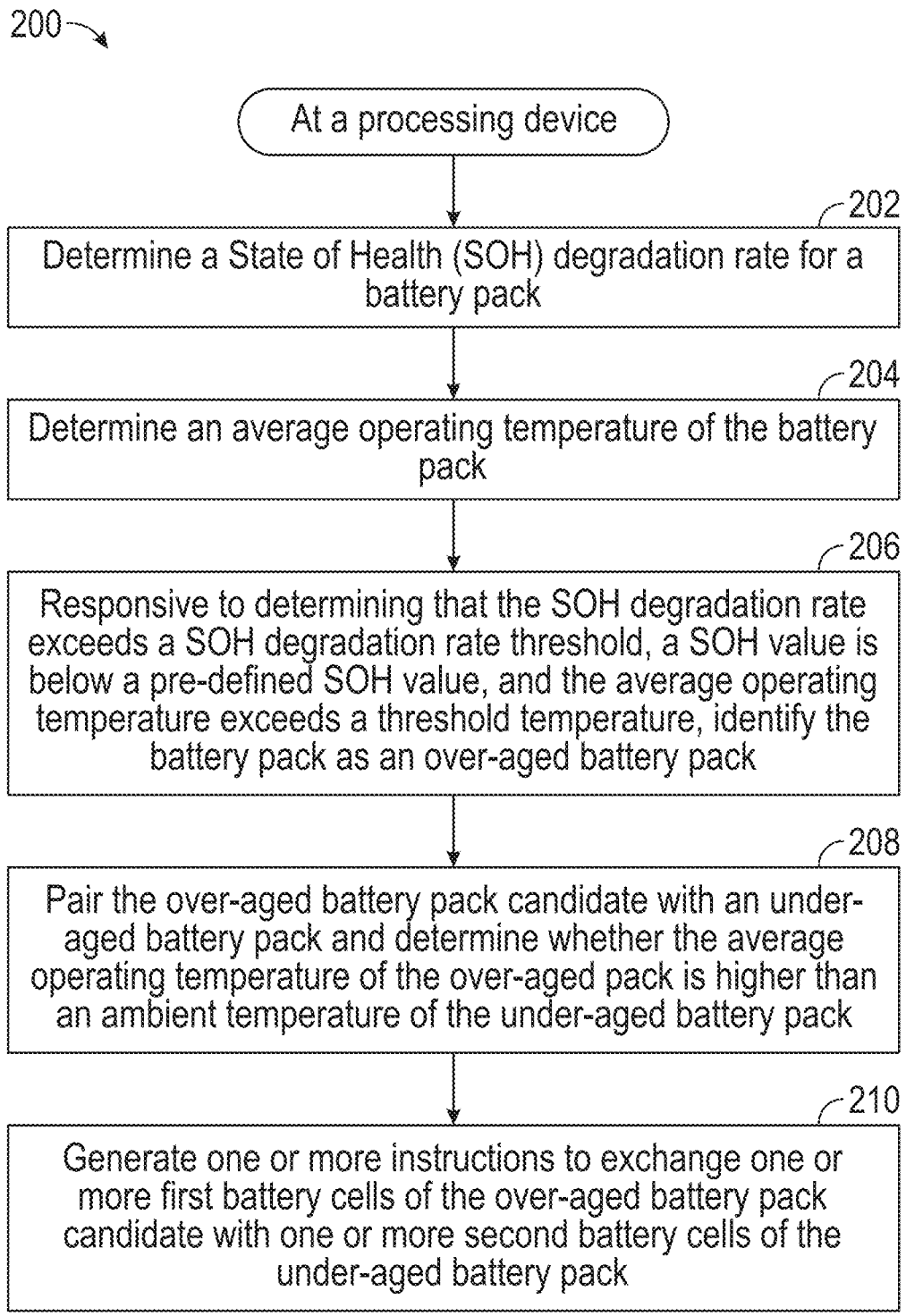
FIG. 2 illustrates example operations of a method for monitoring a battery pack according to certain embodiments of this disclosure.

FIG. 2 illustrates example operations of a method 200 for monitoring a battery pack according to certain embodiments of this disclosure. The method 200 is performed by processing logic that may include hardware (circuitry, dedicated logic, etc.), software (such as is run on a computer system or specialized dedicated machine), or a combination of both. The method 200 or each of their individual functions, routines, subroutines, or operations may be performed by one or more processors of a computing device (e.g., any component of FIG. 1, such as server 128 executing the artificial intelligence recommendation engine 140). In certain implementations, the method 200 may be performed by a single processing thread. Alternatively, the method 200 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device. One or more operations of the method 200 may be performed by the training engine 130 of FIG. 1.

For simplicity of explanation, the method 200 is depicted and described as a series of operations. However, operations in accordance with this disclosure can occur in various orders or concurrently, and with other operations not presented and described herein. For example, the operations depicted in the method 200 may occur in combination with any other operation of any other method disclosed herein. Furthermore, not all illustrated operations may be required to implement the method 200 in accordance with the disclosed subject matter. In addition, those skilled in the art will understand and appreciate that the method 200 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At 202, the processing device may determine a state of health (SOH) degradation rate for a battery pack.

At 204, the processing device may determine an average operating temperature of the battery pack. The processing device may receive one or more historical operating temperatures of the battery pack and determine the average based on those historical operating temperatures, for example.

At 206, responsive to determining that the SOH degradation rate exceeds a SOH degradation rate threshold, a SOH value is below a pre-defined SOH value, and the average operating temperature exceeds a threshold temperature, the processing device may identify the battery pack as an over-aged battery pack.

At 208, the processing device may pair the over-aged battery pack candidate with an under-aged battery pack and determining whether the average operating temperature of the over-aged battery pack is higher than an ambient temperature of the under-aged battery pack.

At 210, the processing device may generate one or more instructions to exchange one or more first battery cells of the over-aged battery pack candidate with one or more second battery cells of the under-aged battery pack. In some embodiments, the processing device may execute an artificial intelligence recommendation engine to generate the one or more instructions. In some embodiments, the one or more instructions may be caused to be presented on a computing device of a user. For example, the computing device may be a smartphone or a console display of the electric vehicle.

In some embodiments, the processing device may identify under-aged or fresh battery packs, wherein the identifying is based on (i) aged due to calendar aging rather than use and/or (ii) consistently slowly charged and operated in warm (between 15 and 35 degrees Celsius) environments, and (iii) the SOH value is higher than a pre-defined threshold.

In some embodiments, the processing device may execute the one or more instructions using a robot to exchange the one or more first battery cells of the over-aged battery pack candidate with the one or more second battery cells of the under-aged battery pack.

In some embodiments, a cloud-based computing system may execute, by, a neural remaining useful life (RUL) model trained using laboratory data, vehicle fleet data, or both, wherein the RUL model is configured to predict a remaining useful life of battery components, and the RUL model trains via continuous learning by comparing previous predictions with current state of health fleet data.

In some embodiments, the processing device may employ a battery management policy to reduce battery waste and extend the life of existing batteries.

Figure 3:
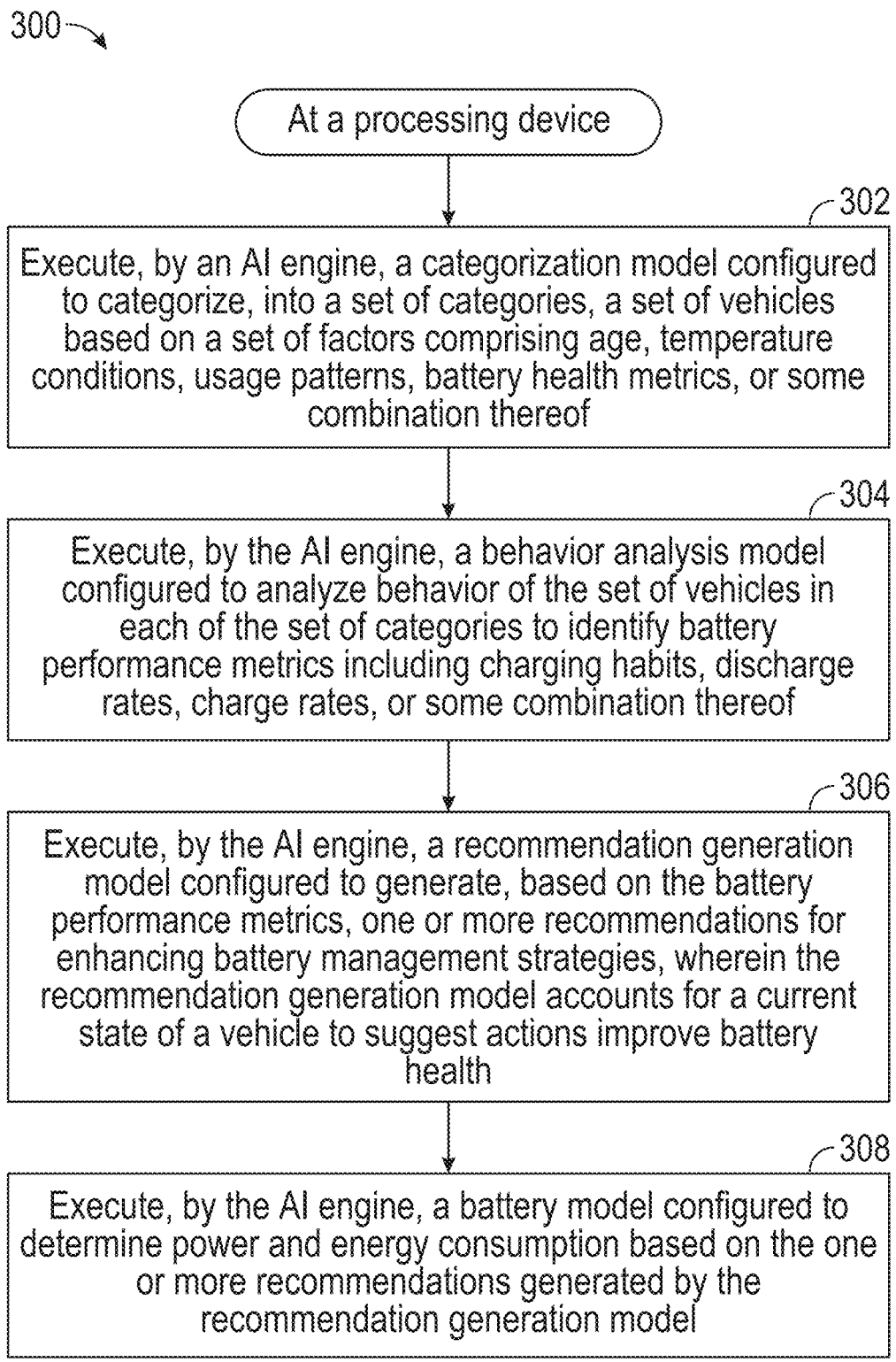
FIG. 3 illustrates example operations of a method for using an artificial intelligence engine to execute a set of models according to certain embodiments of this disclosure.

FIG. 3 illustrates example operations of a method 300 for using an artificial intelligence engine to execute a set of models according to certain embodiments of this disclosure. The method 300 is performed by processing logic that may include hardware (circuitry, dedicated logic, etc.), software (such as is run on a computer system or specialized dedicated machine), or a combination of both. The method 300 or each of their individual functions, routines, subroutines, or operations may be performed by one or more processors of a computing device (e.g., any component of FIG. 1, such as server 128 executing the artificial intelligence recommendation engine 140). In certain implementations, the method 300 may be performed by a single processing thread. Alternatively, the method 300 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device. One or more operations of the method 300 may be performed by the training engine 130 of FIG. 1.

For simplicity of explanation, the method 300 is depicted and described as a series of operations. However, operations in accordance with this disclosure can occur in various orders or concurrently, and with other operations not presented and described herein. For example, the operations depicted in the method 300 may occur in combination with any other operation of any other method disclosed herein. Furthermore, not all illustrated operations may be required to implement the method 300 in accordance with the disclosed subject matter. In addition, those skilled in the art will understand and appreciate that the method 300 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

In some embodiments, the recommendation generation engine receives a reward signal from a neural remaining useful life model, wherein the reward signal indicates how well the one or more recommendations generated by the recommendation generation engine align with a desired goal. In some embodiments, the recommendation generation engine generates the one or more recommendations based on two categories, a first category relates to recommendations related to charging (e.g., optimum charge rate, maximum SOC, etc.), and a second category relates to user guidance related to driver behavior (e.g., minimum SOC, maximum discharge rate (directly related to driver speed). The user may have a chance to override the recommendations and/or user guidance.

At 302, the method 300 may include executing, by the artificial intelligence engine, a categorization model configured to categorize, into a plurality of categories, a plurality of vehicles based on a plurality of factors comprising age, temperature conditions, usage patterns, battery health metrics, or some combination thereof;

At 304, the method 300 may include executing, by the AI engine, a behavior analysis model configured to analyze behavior of the plurality of vehicles in each of the plurality of categories to identify battery performance metrics comprising charging habits, discharge rates, charge rates, or some combination thereof. Further, the method 300 may include using the behavior analysis model to determine an average behavior for each of the plurality of categories.

At 306, the method 300 may include executing, by the AI engine, a recommendation generation model configured to generate, based on the battery performance metrics, one or more of recommendations for enhancing battery management strategies, wherein the recommendation generation model accounts for a current state of a vehicle to suggest actions to improve battery health. In some embodiments, the one or more recommendations may include a minimum state of charge level, a maximum discharge rate, a maximum charge rate, a recommended upper limit for state of charge, or some combination thereof. In some embodiments, the recommendation generation model may generate the one or more recommendations for enhancing battery management strategies without decreasing power or energy capabilities of batteries.

At 308, the method 300 may include executing, by the AI engine, a battery model configured to determine power and energy consumption based on the one or more recommendations generated by the recommendation generation model.

In some embodiments, the method 300 may include executing, by the AI engine, a behavior converter configured to receive the one or more recommendations from the recommendation generation model and convert the one or more recommendations into a battery usage pattern that is applied to a battery model and a neural remaining useful life model.

In some embodiments, the method 300 may include executing, by the AI engine, a behavior sampler configured to generate a plurality of mission profiles including different training scenarios by simulating different types of user behaviors and environmental conditions In some embodiments, the method 300 may include executing, by the AI engine, the one or more recommendations to modify an operating parameter of a battery pack of the vehicle or influencing driver on his driver habits (e.g. drive slower and do not allow SOC to go below a minimum).

Figure 4:
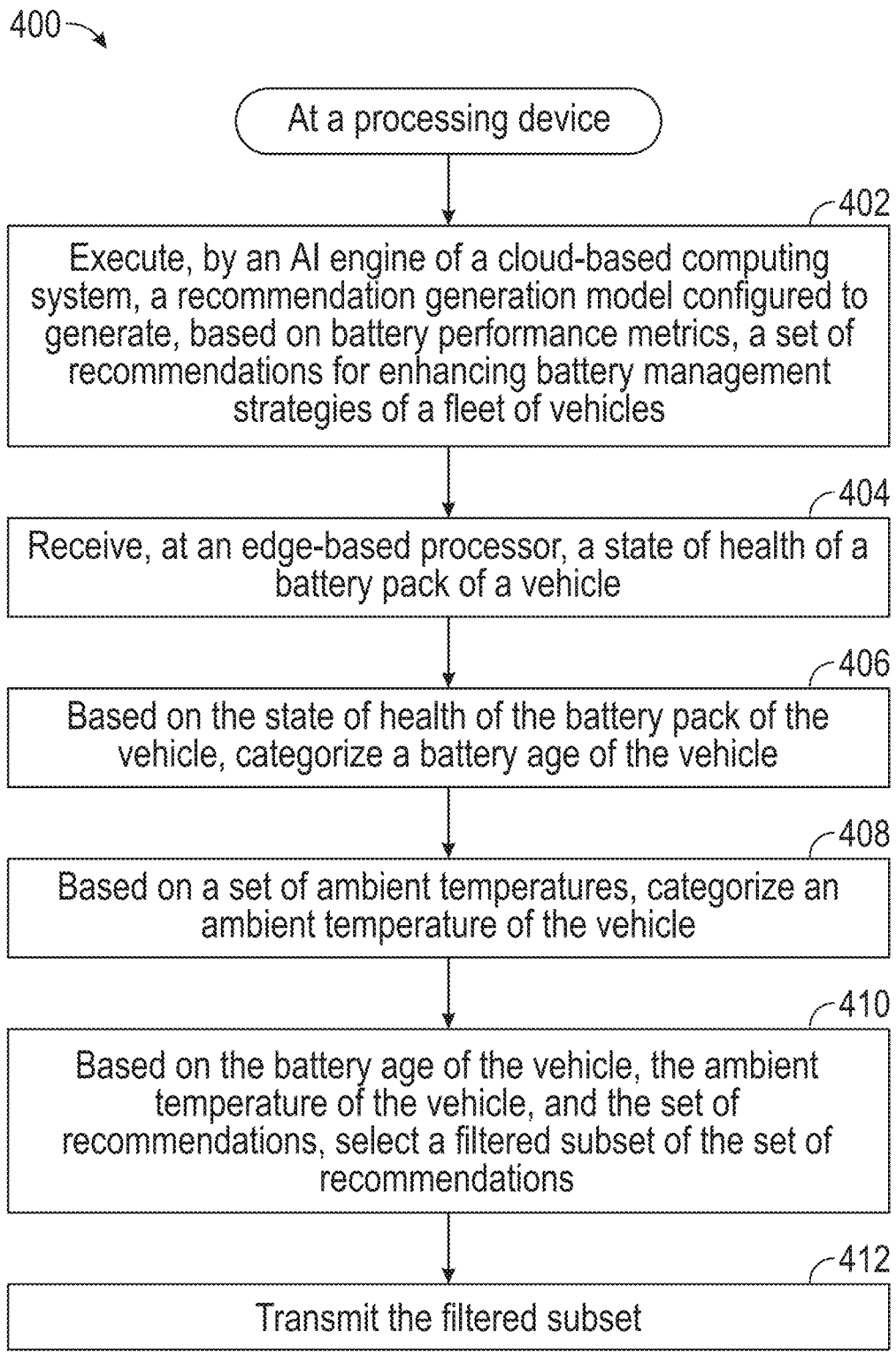
FIG. 4 illustrates example operations of a method for performing filtering at an edge processor according to certain embodiments of this disclosure.

FIG. 4 illustrates example operations of a method 400 for performing filtering at an edge processor according to certain embodiments of this disclosure. The method 400 is performed by processing logic that may include hardware (circuitry, dedicated logic, etc.), software (such as is run on a computer system or specialized dedicated machine), or a combination of both. The method 400 or each of their individual functions, routines, subroutines, or operations may be performed by one or more processors of a computing device (e.g., any component of FIG. 1, such as server 128 executing the artificial intelligence recommendation engine 140). In certain implementations, the method 400 may be performed by a single processing thread. Alternatively, the method 400 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device. One or more operations of the method 400 may be performed by the training engine 130 of FIG. 1.

For simplicity of explanation, the method 400 is depicted and described as a series of operations. However, operations in accordance with this disclosure can occur in various orders or concurrently, and with other operations not presented and described herein. For example, the operations depicted in the method 400 may occur in combination with any other operation of any other method disclosed herein. Furthermore, not all illustrated operations may be required to implement the method 400 in accordance with the disclosed subject matter. In addition, those skilled in the art will understand and appreciate that the method 400 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At 402, the method 400 may include executing, by an AI engine of a cloud-based computing system, a recommendation generation model configured to generate, based on battery performance metrics, a set of recommendations for enhancing battery management strategies of a fleet of vehicles. In some embodiments, the recommendation generation model may account for a current state of the vehicle to suggest actions to improve battery health.

At 404, the method 400 may include receiving, at an edge-based processor, a state of health of a battery pack of a vehicle. The edge-based processor may be included in the computing device 102 or edge/vehicle 117.

At 406, the method 400 may include, based on the state of health of the battery pack of the vehicle, categorizing a battery age of the vehicle. In some embodiments, categories associated with battery age include fresh, middle-aged, aged, under-aged, over-aged, etc.

At 408, the method 400 may include, based on a set of ambient temperatures, categorizing an ambient temperature of the vehicle. In some embodiments, categories associated with the ambient temperature include cold, warm, and hot.

In some embodiments, the edge-based processor may receive the set of ambient temperatures, and based on the set of ambient temperatures, the edge-based processor may determine an average temperature.

At 410, the method 400 may include, based on the battery age of the vehicle, the ambient temperature of the vehicle, and the set of recommendations, selecting a filtered subset of the set of recommendations.

At 412, the method 400 may include transmitting the filtered subset. In some embodiments, the transmitted filtered subset are presented on a computing device in the vehicle, another computing device remote from the vehicle, or both.

In some embodiments, a processing device may modify, based on the filtered subset, an operating parameter of the battery pack of the vehicle to charge at an altered rate, consume a different amount of energy, or both.

In some embodiments, the processing device may generate user guidance related to a minimum state of charge level, maximum discharge rate, average driving speed, or some combination thereof. Further, the processing device may filter the user guidance and transmit a filtered subset of user guidance to a computing device associated with the user. The filtered subset of user guidance may be presented on a user interface.

Figure 5:
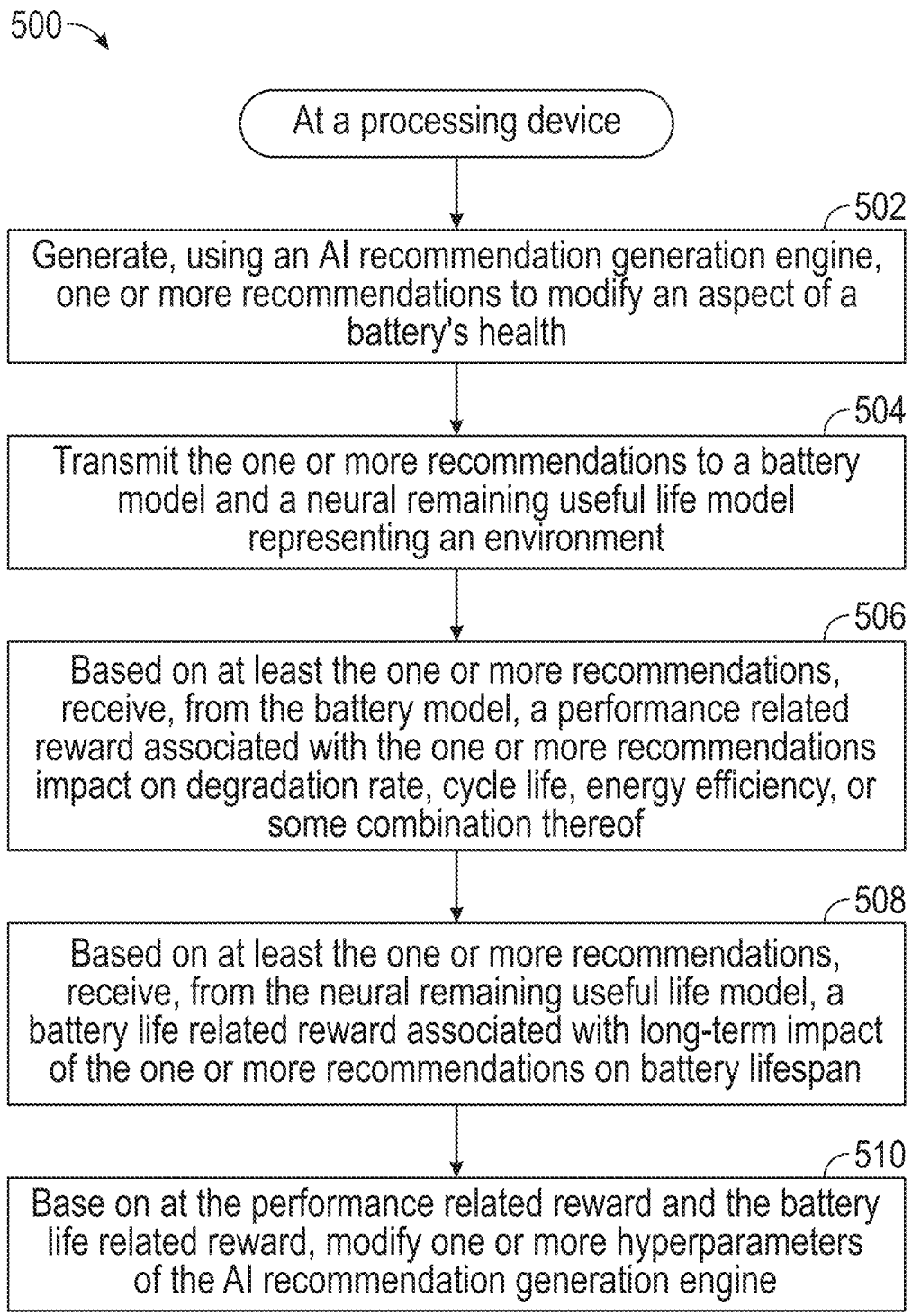
FIG. 5 illustrates example operations of a method for performing reward functionality of a battery model and a remaining useful life model according to certain embodiments of this disclosure.

FIG. 5 illustrates example operations of a method 500 for performing reward functionality of a battery model and a remaining useful life model according to certain embodiments of this disclosure. The method 500 is performed by processing logic that may include hardware (circuitry, dedicated logic, etc.), software (such as is run on a computer system or specialized dedicated machine), or a combination of both. The method 500 or each of their individual functions, routines, subroutines, or operations may be performed by one or more processors of a computing device (e.g., any component of FIG. 1, such as server 128 executing the artificial intelligence recommendation engine 140). In certain implementations, the method 500 may be performed by a single processing thread. Alternatively, the method 500 may be performed by two or more processing threads, each thread implementing one or more individual functions, routines, subroutines, or operations of the methods. In some embodiments, one or more accelerators may be used to increase the performance of a processing device by offloading various functions, routines, subroutines, or operations from the processing device. One or more operations of the method 500 may be performed by the training engine 130 of FIG. 1.

For simplicity of explanation, the method 500 is depicted and described as a series of operations. However, operations in accordance with this disclosure can occur in various orders or concurrently, and with other operations not presented and described herein. For example, the operations depicted in the method 500 may occur in combination with any other operation of any other method disclosed herein. Furthermore, not all illustrated operations may be required to implement the method 500 in accordance with the disclosed subject matter. In addition, those skilled in the art will understand and appreciate that the method 500 could alternatively be represented as a series of interrelated states via a state diagram or events.

In some embodiments, one or more machine learning models may be generated and trained by the artificial intelligence engine and/or the training engine to perform one or more of the operations of the methods described herein. For example, to perform the one or more operations, the processing device may execute the one or more machine learning models. In some embodiments, the one or more machine learning models may be iteratively retrained to select different features capable of enabling optimization of output. The features that may be modified may include a number of nodes included in each layer of the machine learning models, an objective function executed at each node, a number of layers, various weights associated with outputs of each node, and the like.

At 502, a processing may generate, using an artificial intelligence (AI) recommendation generation engine, one or more recommendations to modify an aspect of a battery's health.

At 504, the processing device may transmit the one or more recommendations to a battery model and a neural remaining useful life model representing an environment.

At 506, the processing device may, based on at least the one or more recommendations, receive, from the battery model, a performance related reward associated with the one or more recommendations impact on degradation rate, cycle life, energy efficiency, or some combination thereof.

At 508, the processing device may, based on at least the one or more recommendations, receive from the neural remaining useful life model, a battery life related reward associated with long-term impact of the one or more recommendations on battery lifespan.

At 510, the processing device may, based on the performance related reward and the battery life related reward, modifying one or more hyperparameters of the AI recommendation generation engine.

In some embodiments, the processing device may execute a behavior sampler to generate diverse mission profiles. The behavior sampler may be implemented in computer instructions stored on one or more memory devices and executed by one or more processing devices. In some of the embodiments, each of the mission profiles represent different operational scenarios (e.g., speeds of the vehicle, charging rates, discharging rates, etc.). In some embodiments, for each of the mission profiles, the processing device may initialize a state of the battery at a random aging point (fresh, middle-aged, aged, etc.). In some embodiments, the processing device may simulate the battery's operation based on training policy, and may determine which rewards are received from the neural remaining useful life model and the battery model during the simulations.

In some embodiments, the processing device may continue simulating the battery's operation based on the training policy until an end of life state is reached based on modeling. In some embodiments, the processing device may reiterate sampling of new missions and training cycles to determine which operational scenarios result in the most desirable rewards generated during the simulations. In some embodiments, the processing device may continuously monitor performance metrics and battery life metrics and adjust hyperparameters as desired. The processing device may adjust the hyperparameters and weights of the models to achieve a balance between lifetime vs. performance of the batteries during the simulations.

Figure 6:
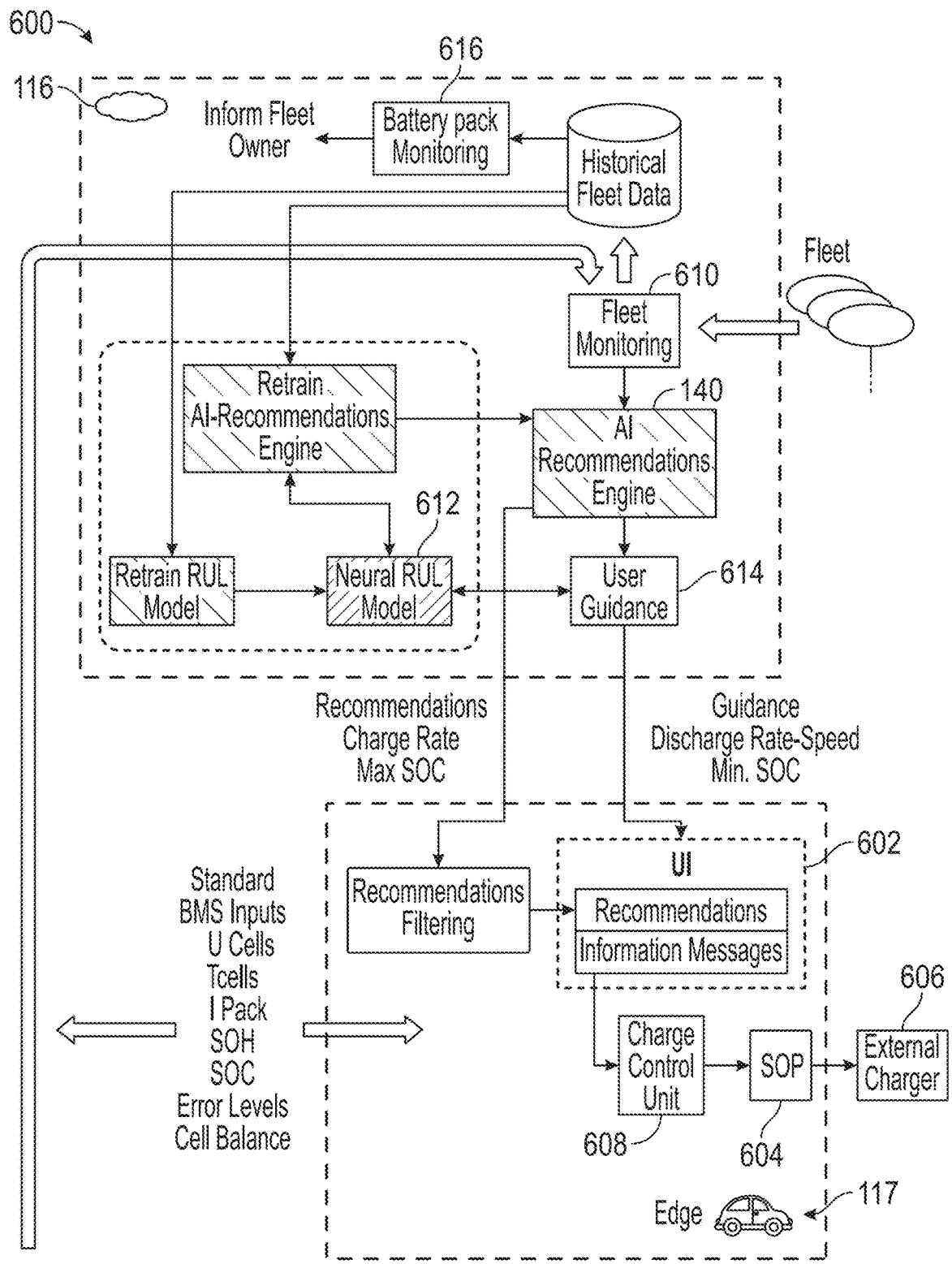
FIG. 6 illustrates an example architecture for using an AI recommendation engine to provide recommendations and/or user guidance to an edge processor according to certain embodiments of this disclosure.

FIG. 6 illustrates an example architecture 600 for using an AI recommendation engine 140 to provide recommendations and/or user guidance to an edge processor according to certain embodiments of this disclosure. Some embodiments of the present disclosure place longevity enhancement by considering usage conditions at the forefront, ensuring minimal performance trade-offs. In addition to extending the battery's lifespan, its performance is also optimized for sustained efficiency and reliability. In order to enhance longevity and optimize performance, the system recommends optimum charging rate, discharging rate, and SOC operation window. Users can select the options that best suit their preferences and requirements, which may enable users to make informed decisions that contribute to extend the life of their batteries and optimizing overall performance. With these features, some embodiments automatically control operation of the battery's charging profile based on recommendations, guidance, and/or preferences.

As depicted, at the edge 117 includes a user interface 602 that is configured to display information messages and presents a list of recommendation choices. Users are presented with the option to select an item from the list, and appropriate charging actions are taken based on the selection. Additionally, the user interface 602 may present actions that are performed dynamically, for example by a state of power software 604 may be executed by an edge processing device that executes instructions to modify a charging policy (e.g., voltage, current) of an external charger 606 that charges a battery. The user interface 602 may also present user guidance messages that appear when the user's average driving speed exceeds the recommended speed (discharge C-rate) and when the vehicle is typically operated below the recommended minimum state of charge (SOC) level. These messages may enable the users to make informed decisions.

Computed charging recommendations may be generated by the AI recommendation engine 140 from the cloud-based computing system 116 and are filtered on the edge 117 for the individual vehicle. Recommendations may guide the user towards optimum battery lifespan choices. Users can then review the recommendations provided by the user interface 602 and take appropriate actions based on the insights provided.

A battery management system (BMS) may determine the SOH, SOC, and error levels on the edge. These calculations as well as BMS inputs (cell voltages, cell power level, pack current, state of health (ratio of current capacity to nominal capacity), state of charge (shows remaining charge in battery), error levels (error levels in cell voltages and cell power levels), and cell balance) are also transferred to the cloud-based computing system 116. Historical BMS data may be stored in the cloud-based computing system 116. A charge control unit 608 may publish maximum current over a given horizon based on user choices. The charge control unit 608 may be implemented in computer instructions stored on one or more memory devices and executed by one or more processing devices. Given maximum current value, the SOP software 604 publishes charging policy to external charger 606 to cause the external charger 606 to modify one or more operating parameters to charge a battery. The SOP software 604 may be implemented in computer instructions stored on one or more memory devices and executed by one or more processing devices.

At the cloud-based computing system 116, fleet monitoring 610 may be implemented in computer instructions stored on one or more memory devices and executed by one or more processing devices. Fleet monitoring 610 may enable categorizing historical data and storing the historical data in the cloud-based computing system 116. Pertinent data related to the RUL and the AI recommendation engine, including cell voltages, currents, temperatures, SOC, SOH, charging behavior are transmitted to the cloud-based computing system 116 for recording, analysis and processing. This data may be referred to as "relevant data" from hereon. Relevant data may be categorized according to average operating temperature, SOH, charging behavior.

In some embodiments, a neural remaining useful life (RUL) model 612 may be implemented in computer instructions stored on one or more memory devices and executed by one or more processing devices. The neural RUL model 612 may be a neural network. The neural RUL model 612 may be trained using a combination of laboratory data and fleet data. Before deployment in the fleet, the neural RUL model 612 may be trained using laboratory data. This data includes controlled conditions to predict the remaining useful life of battery components or battery systems. Once deployed in the fleet, the neural RUL model 612 may continue to learn and improve its predictions based on the historical usage and state of health data collected from the vehicles in the fleet. The neural RUL model's 612 predictions may be regularly checked against fleet data, and the neural RUL model 612 may be retrained with this data, if needed. For instance, this check may involve comparing the latest six months of SOH data with the RUL predictions made six months ago. Over time, the neural RUL model 612 accumulates more data and refines its predictions, providing insights into when battery components may fail or need maintenance. The neural RUL model 612 may become more accurate in its predictions with continuous learning.

In some embodiments, the AI recommendation engine 140 is responsible for making recommendations aimed at optimizing the longevity and performance of the vehicles or their components. The AI recommendation engine 140 may be implemented in computer instructions stored on one or more memory devices and executed by one or more processing devices. The AI recommendation engine 140 may execute in tandem with the neural RUL model 612 and a battery model. leveraging reinforcement learning (RL) techniques to enhance longevity and optimize performance. The battery model may be implemented in computer instructions stored one or more memories and executed by one or more processing devices. The recommendations may be transmitted to the user guidance module 614 and the user interface 602. Similar to the neural RUL model 612, the AI recommendation engine 140 also utilizes historical fleet data to enhance its recommendations. Initially, prior to first deployment, the AI recommendation engine 140 may be trained with laboratory degradation data. The recommendations generated by the AI recommendation engine 140 may relate to maximum/minimum SOC levels and charge and discharge rates. In some embodiments, minimum SOC and discharge rates may be input into the user guidance module 614 to produce metric-based guidance for individual users.

In some embodiments, the cloud-based computing system 116 processing uses relevant data for continuous learning by retraining the various models (e.g., neural networks, machine learning models, etc.). This continuous flow of data enables the system to continually refine its predictive models, enhance decision-making capabilities, and adapt to changing conditions, ultimately improving the accuracy and effectiveness of predictive maintenance and operational strategies over time. The neural RUL model's 612 predictions are regularly checked against fleet data and retrained with this data if needed. The neural RUL model's 612 predictions are reviewed periodically. For instance, this check involves comparing the latest SOH data with the RUL predictions previously made. If the difference between the RUL output and SOH values exceeds a certain threshold, the neural RUL model 612 may be retrained. After the neural RUL model 612 is retrained, the AI recommendation engine's 140 battery model may also be retrained using the updated fleet data and the retrained RUL model.

Overall, the disclosed embodiments may serve as a sophisticated longevity-enhancing tool that leverages both predictive analytics (e.g., from the neural RUL model) to optimize fleet performance and longevity. By providing actionable recommendations through the user interface, it enables proactive maintenance and operational strategies to be implemented, ultimately enhancing the efficiency and reliability of the fleet. Further, the recommendations may be automatically executed by an edge processor to change a charging policy of a battery of the edge/vehicle 117.

Some embodiments execute a battery pack monitoring model 616, which is an additional feature available for fleet owners. The battery pack monitoring model 616 may be implemented in computer instructions stored on one or more memory devices and executed by one or more processing devices. For battery as a service use cases, the battery pack monitoring model 616 may enable the ability to exchange over-aged battery packs with those that have aged more slowly, taking into account the influence of temperature.

The battery pack monitoring model 616 may inform owners when to exchange over-aged battery packs with those that have aged more slowly, considering temperature effects. By leveraging the battery pack monitoring model 616, fleet owners can optimize battery usage, extend the lifespan of their packs, and ensure more efficient and cost-effective operations.

By recommending replacing a battery pack that has aged more quickly in a hotter environment with one that has aged more slowly in a cooler environment. the battery pack monitoring model 616 aims to slow down the aging process of the rapidly aging cells and extend their lifespan. Additionally, this ensures that vehicles in hot regions receive younger battery packs without the need for a new pack. This way, fleet owners can aim to extend the average lifespan of their fleet. In some embodiments, a robot may be controlled to replace one or more battery packs that have aged more quickly. Control instructions may be generated by the cloud-based computing system 116 and transmitted to the robots to guide them to replace an aged battery pack.

Some embodiments may use the battery pack monitoring model 616 to perform battery pack monitoring by performing a battery aging analysis. Battery aging analysis may include determining an SOH degradation rate for each battery pack. The SOH degradation rate indicates how quickly the battery is aging. Further, the battery aging analysis may determine the average operating temperature of the battery packs. The battery pack monitoring model 616 may be trained to identify over-aged packs by comparing the SOH degradation rate with a predefined SOH degradation rate threshold, comparing the SOH with a predefined SOH threshold, and if the SOH degradation rate exceeds a predefined threshold and the actual SOH is below a predefined threshold, and the average ambient temperature is greater than a predefined threshold temperature, the battery pack monitoring model 616 identifies these battery packs as candidates for exchange.

The battery pack monitoring model 616 may also be trained to identify under-aged battery packs that have aged more slowly. An example of under-aged packs are those that have aged more slowly due to calendar aging rather than heavy use.

The battery pack monitoring model 616 may pair each over-aged pack with an under-aged pack, ensuring that the aged pack's ambient temperature is higher than the fresh pack's ambient temperature. This may ensure that each aged cell is replaced with a younger cell from a cooler environment.

In some embodiments, insights gathered from the battery aging analysis, the system may generate information for battery pack exchanges. The recommendations aim to replace over-aged battery packs in hotter environments with fresh battery packs from cooler environments. Exchange logistics may be set up in a variety of ways by fleet managers. Automated battery pack replacements may be carried out by one or more robots or automated devices.

In some embodiments, by managing the exchange of battery packs based on aging rates and temperature influence, the overall lifespan of the batteries is extended. Battery pack monitoring model 616 may reduce the need for purchasing new battery packs by optimizing the usage of existing ones. The battery pack monitoring model 616 may ensure that vehicles in hot regions operate with more reliable and fresh battery packs, improving overall fleet performance. In some embodiments, policy promotes sustainable practices by reducing battery waste and extending the life of existing batteries.

Figure 7:
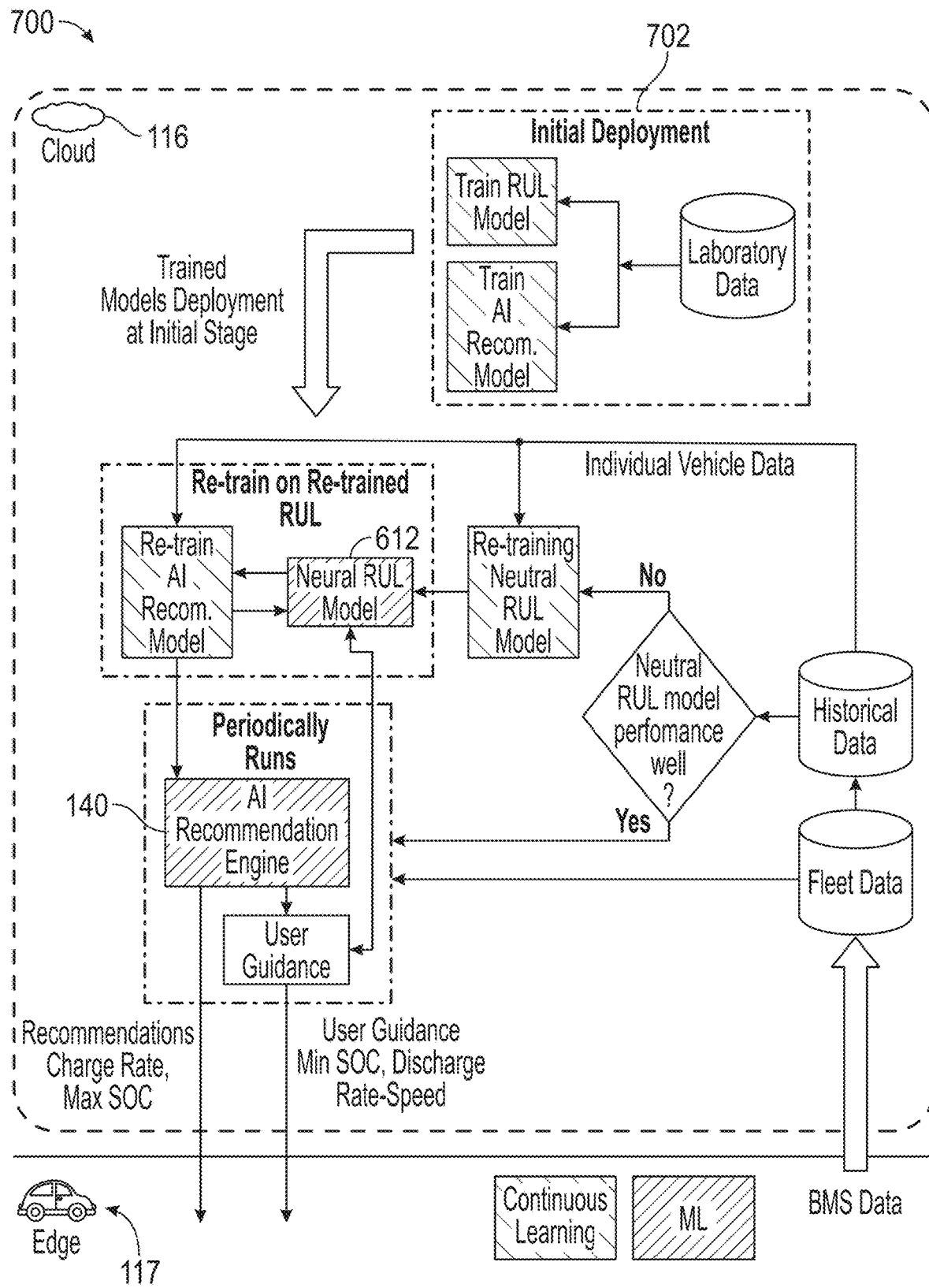
FIG. 7 illustrates an example architecture for a cloud-based computing system according to certain embodiments of this disclosure.

FIG. 7 illustrates an example architecture 700 and flow of information for a cloud-based computing system 116 according to certain embodiments of this disclosure. As depicted, an initial deployment 702 of neural RUL model 612 and AI recommendations engine 140 may occur after being trained on lab data. The lab data may provide a starting point of reference for the neural RUL model 612 and AI recommendation engine 140. As real-life fleet data comes in, performance and accuracy of the neural RUL model 612 and AI recommendation engine 140 may increase significantly.

Performance of neural RUL model 612 may be continuously monitored using historical fleet data. With fresh data coming in from individual vehicles, performance and accuracy of the neural RUL model 612 may be checked and if it drops against a pre-determined threshold levels or historical values, the neural RUL model 612 is re-trained on historical fleet data.

The re-trained RUL model and historical data may be used to re-train AI-recommendations engine. Following re-training of both the neural RUL model 612 and the AI recommendation engine 140, operations may resume to generate recommendations and/or user guidance.

In some embodiments, continuous learning and historical data may enable both the neural RUL model 612 and the AI recommendations engine 140 to become more accurate resulting in better user guidance messages.

Figure 8:
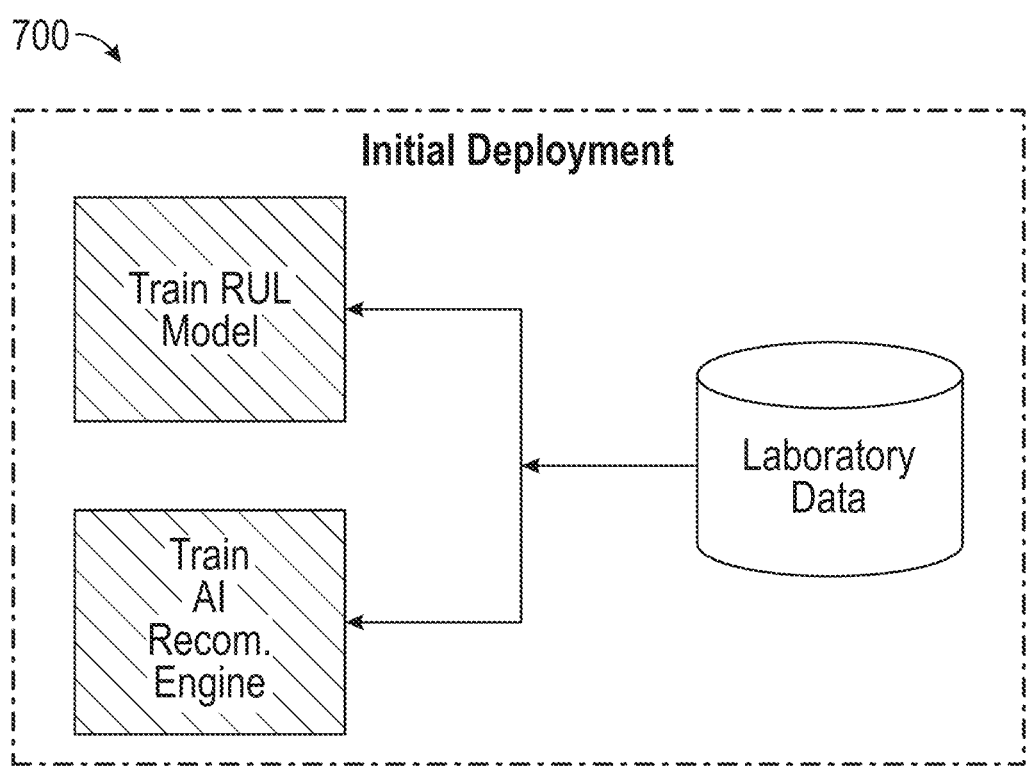
FIG. 8 illustrates an example initial deployment of models according to certain embodiments of this disclosure.

FIG. 8 illustrates an example initial deployment 700 according to certain embodiments of this disclosure. The neural RUL model 612 may estimate or predict how much longer a battery will function effectively. The AI recommendation engine 140 may recommend usage patterns aimed at prolonging battery life by analyzing various factors that impact battery health. In the initial stages, before any fleet data has been collected, laboratory data may be utilized to train both the neural RUL model 612 and the AI recommendation engine 140. Laboratory data refers to experimental data collected in controlled environments, such as research laboratories or testing facilities.

Laboratory experiments allow researchers to precisely control variables such as temperature, load conditions, and charging cycles to simulate various operating scenarios and assess their impact on battery performance.

The laboratory data may be used to train the neural RUL model 612 and the AI recommendation engine 140, enabling them to learn the relationships between different operating conditions and battery health.

Figure 9:
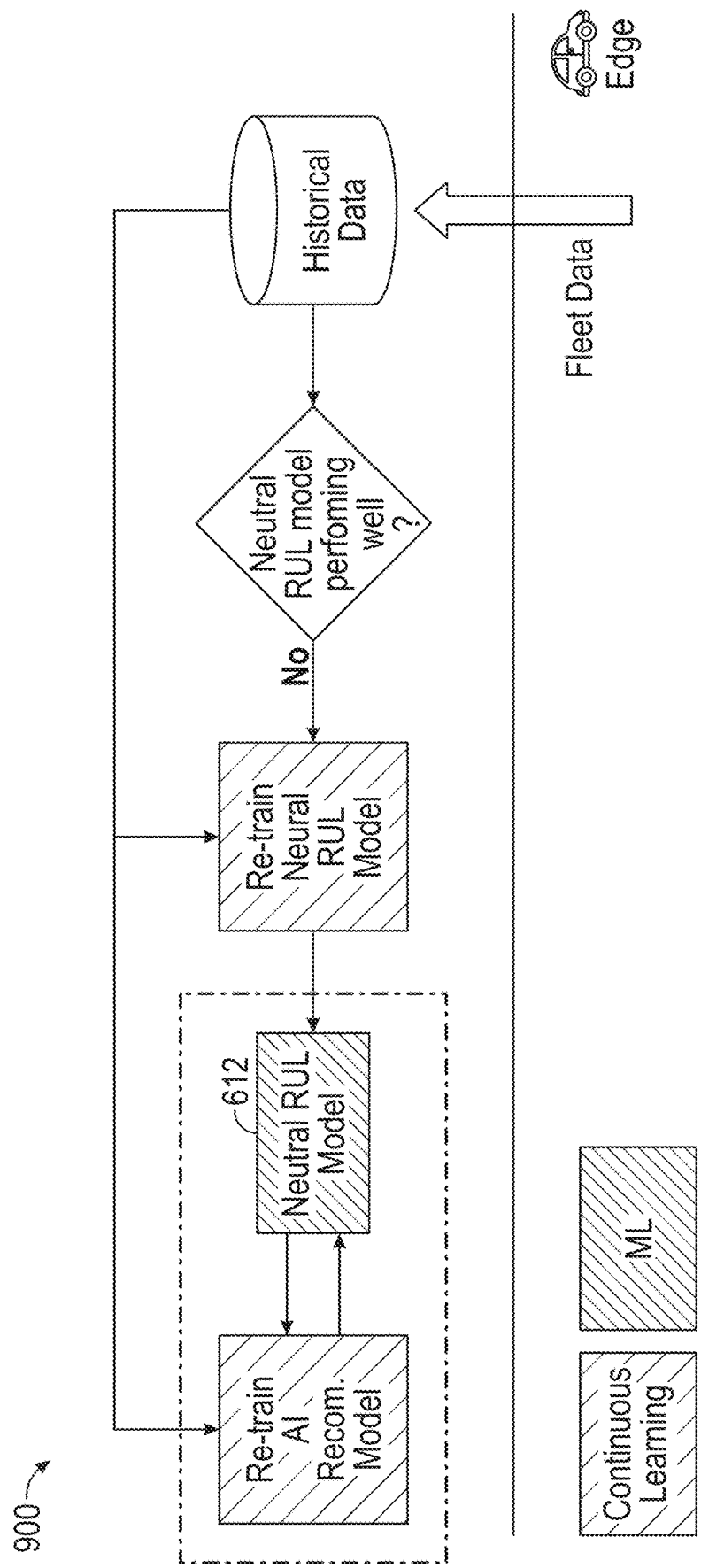
FIG. 9 illustrates an example of a continuous learning flow chart according to certain embodiments of this disclosure.

FIG. 9 illustrates an example of a continuous learning flow chart 900 according to certain embodiments of this disclosure. Continuous learning may be used for both the neural RUL model 612 and the AI recommendation engine 140 to adapt to changing conditions and improve their performance over time.

Regarding the neural RUL model 612, in some embodiments, as battery management system data is sent to the cloud and stored in a database, the fleet data is continuously accumulated. The neural RUL model 612 predictions are reviewed periodically (e.g., 3-6 months). This check involves comparing the latest SOH data with the RUL predictions previously made. If the difference between the RUL output and SOH values exceeds a certain threshold, it may indicate that model has not performed well. In some embodiments, the model is then retrained. Retraining may allow the neural RUL model 612 to incorporate new patterns and trends observed in the larger dataset, improving its accuracy and predictive capabilities.

Regarding the AI recommendation engine 140, in some embodiments, similar to the neural RUL model 612, the AI recommendation engine 140 may leverage the accumulated BMS data stored in the database. The AI recommendation engine 140 may undergo retraining following the neural RUL model 612 retraining. This is because the neural RUL model 612 may be used as the environment during the training phase of the AI recommendation engine 140. When the neural RUL model 612 is retrained, the updated RUL model is utilized, and the AI recommendation engine 140 may be retrained with the retrained RUL model. Retraining the AI recommendation engine 140 may allow it to adapt to evolving usage patterns and environmental factors, ensuring that its suggestions remain relevant and effective. As the retrained AI recommendation engine 140 has updated policies, the AI recommendation engine 140 may not communicate with RUL model during the AI recommendation engine's 140 routine operations.

Continuous learning may enable that both the neural RUL model 612 and the AI recommendation engine 140 stay up-to-date with the latest data and continuously improve their performance, which may ultimately lead to better battery management and significantly longer battery lifespan.

Figure 10:
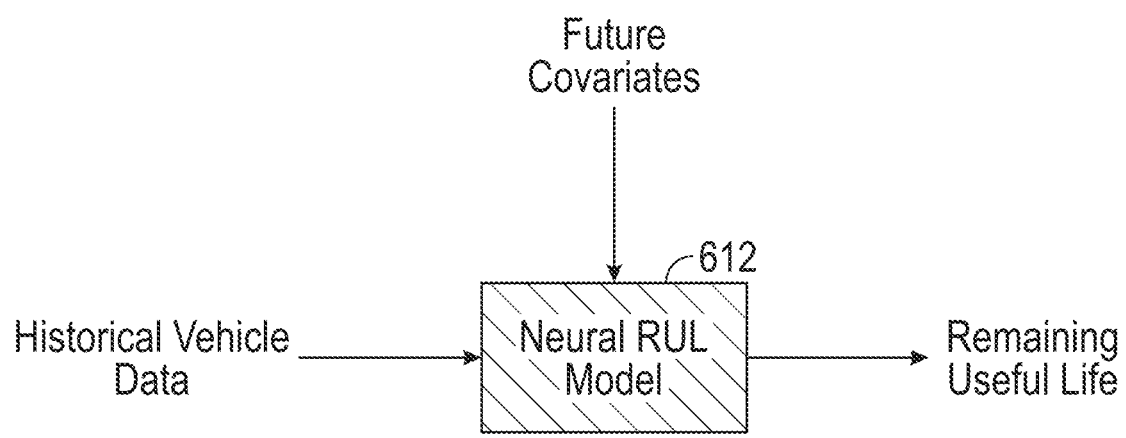
FIG. 10 illustrates an example of a neural remaining useful life model according to certain embodiments of this disclosure.

FIG. 10 illustrates an example of a neural RUL model 612 according to certain embodiments of this disclosure. The neural RUL model 612 may estimate or predict how much longer a battery will function effectively. The neural RUL model 612 calculates the remaining useful life of a battery, expressing it either in weeks, months, or cycles until it reaches the end of its life. The "end of life" for a battery varies depending on the application, but it is commonly defined as when the battery's state of health drops to 80% of its nominal capacity. The remaining useful life represents the time or number of cycles left until the battery reaches this point. For example, the system might indicate that the battery has 3 years or 300 cycles left before it reaches the end of its life. If the system predicts that a battery will last for another 3 years or 300 cycles, this means it will take that amount of time or those many charge-discharge cycles for the battery to degrade to 80% SOH.

The neural RUL model 612 is not only trained on historical data but also considers additional factors known as future covariates. Historical data includes measurements of current, voltage, temperature, and calculated values such as accumulated charge throughput and SOH over time. Future covariates may be generated by the AI recommendation engine 140. Future covariates represent various parameters such as temperature, voltage, current that can influence the battery's degradation rate and remaining lifespan. Future covariates allow the neural RUL model 612 to make predictions based on AI recommendation engine 140 recommendations. The neural RUL model 612 estimates by how much battery lifespan can be improved if recommendations are followed.

When making predictions, the neural RUL model 612 not only analyzes past data but also takes into account the expected future values of these covariates. For example, if the temperature or load conditions are expected to change significantly in the future, the neural RUL model 612 incorporates these projections into its calculations.

By considering future covariates, the neural RUL model 612 becomes more robust and adaptable to different operating scenarios. The neural RUL model 612 can anticipate how changes in driving conditions or usage patterns might impact the battery's health and remaining useful life.

This capability is particularly valuable in real-world applications where driving conditions can vary widely. For instance. if a vehicle is expected to undergo more frequent charging cycles or operate in extreme temperatures, the neural RUL model can adjust its predictions accordingly.

Future covariates may be utilized for the AI recommendations engine 140 training and operation. Based on these future covariates provided by the AI recommendation engine 140 during the training phase, the neural RUL model 612 may predict the remaining useful life and uses it as a reward for training. Future covariates may allow the AI recommendations engine 140 to estimate metrics. For example, "Your battery will last 24 months longer if you reduce your average speed to 120 km/h"

In cases where future covariates are not provided, the neural RUL model 612 relies solely on historical data to make predictions. In this scenario, the neural RUL model 612 extrapolates from past patterns and trends in the data to estimate the remaining useful life of the battery. Future covariates are utilized for the AI recommendations engine 140 training and operation. Based on these future covariates provided by the AI recommendation engine 140 during the training phase, the neural RUL model 612 predicts the remaining useful life of the battery.

Figure 11:
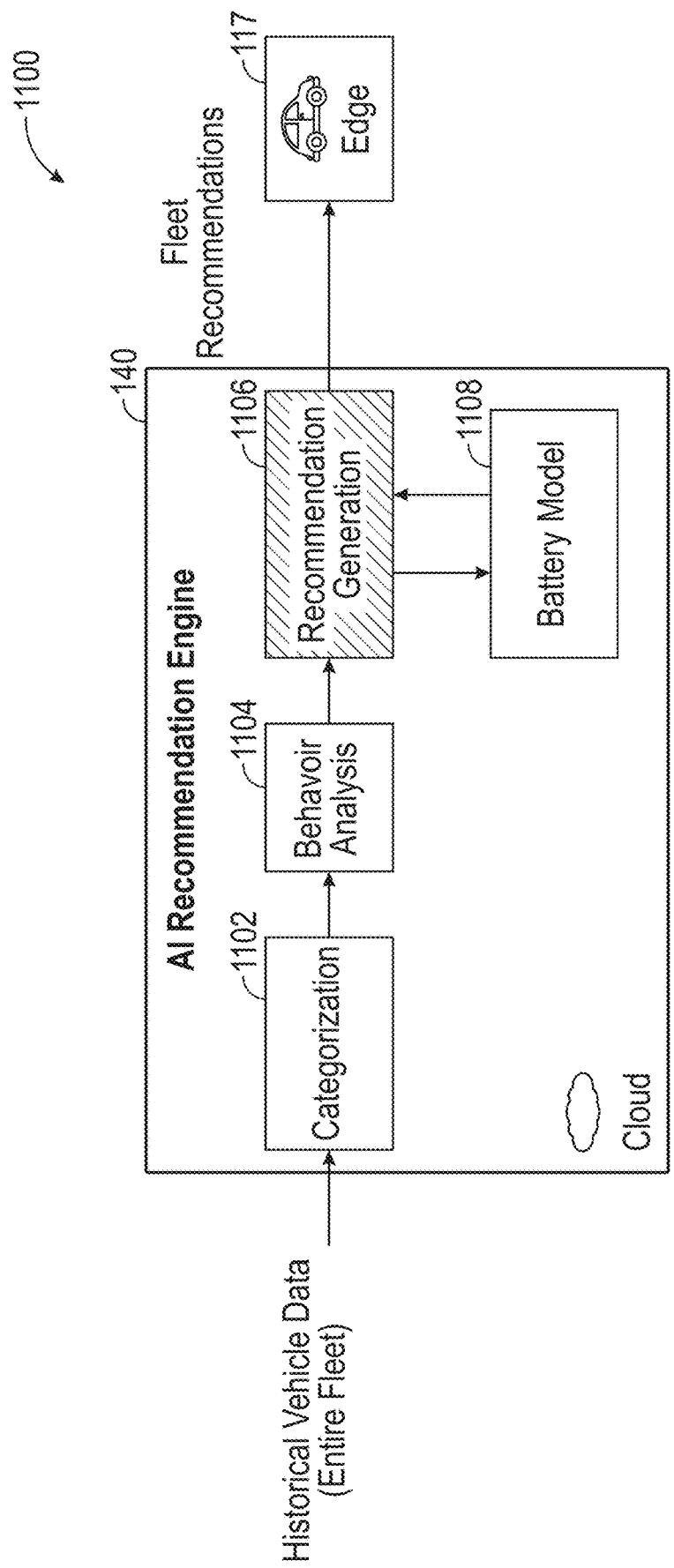
FIG. 11 illustrates an example flow chart of an AI recommendation engine according to certain embodiments of this disclosure.

FIG. 11 illustrates an example flow chart 1100 of an AI recommendation engine 140 according to certain embodiments of this disclosure. The AI recommendation engine 140 is an intelligent system designed to optimize battery management strategies with at least one goal of prolonging battery life. The AI recommendation engine 140 comprises four sub-models, each playing a role in optimizing battery management strategies. Each of the four sub-models may be implemented in computer instructions stored on one or more memory devices and executed by one or more processing devices.

The AI recommendation engine 140 may include a categorization model 1102. This sub-model may categorize vehicles based on various factors such as age, temperature conditions, usage patterns, and battery health metrics. In some embodiments, by segmenting the fleet into distinct groups (e.g., based on battery age and temperature), it lays the foundation for targeted analysis and recommendation generation.

The AI recommendation engine 140 may include a behavior analysis model 1104. This may be a mathematical model that analyzes the behavior of vehicles within each category. It identifies usage patterns, charging habits, discharge rates, and other relevant metrics to understand how different factors impact battery performance and longevity.

The AI recommendation engine 140 may include a battery model 1108. This may be a mathematical sub-model that determines power and energy consumption based on the recommendations provided by a recommendation generation model 1106. It takes into account factors such as charging/discharging rates, environmental conditions, and battery health to estimate the battery's energy and power capability.

The AI recommendation engine 140 may include a recommendation generation model 1106. This sub-model may leverage artificial intelligence (AI) algorithms (e.g., machine learning models, neural networks), this sub-model may generate recommendations for optimizing battery management strategies. The system considers the current state of vehicle data to suggest actionable steps for improving battery health and prolonging lifespan, without decreasing power or energy capability. In some embodiments, the AI recommendation engine 140 may update its policies during retraining.

By integrating these four sub-models, the AI recommendation engine 140 may deliver holistic and data-driven recommendations that empower fleet managers to make informed decisions, maximize battery efficiency, and extend the operational lifespan of their vehicles. Further, the recommendations may be used to directly control operation of the battery to enhance battery efficiency and extend the operational lifespan of their batteries and vehicles.

The AI recommendation engine 140 is an intelligent system designed to optimize battery management strategies with the at least a goal of prolonging battery life. The AI recommendation engine 140 generates recommendations fleet-wide.

In some embodiments, to generate recommendations, the AI recommendation engine 140 performs categorization: The system sorts all fleet vehicles into a certain number (e.g. 9) groups based on age and temperature conditions: fresh/hot, fresh/cold, fresh/warm, middle-aged/hot, middle-aged/cold, middle-aged/warm, aged/hot, aged/cold, and aged/warm.

Once categorized, the AI recommendation engine 140 may determine the average behavior of each category. This analysis may encompass various factors, such as usage patterns, charging habits, and discharge rates.

In some embodiments, leveraging the insights gathered from the behavior analysis, the AI recommendation engine 140 may generate recommendations and guidance tailored to each category. These recommendations are designed to optimize battery management strategies and are based on the average behavior observed within each category. For each vehicle category, the AI recommendation engine 140 outputs recommendations for: (i) user guidance, minimum SOC level (the minimum acceptable state of charge level at the end of discharge phase to maintain battery health), and maximum discharge current (the maximum permissible discharge rate to avoid stressing the battery), and (ii) recommendations, maximum charge current (the maximum allowable charging rate to reduce the speed of degradation while increase the speed of charging), and maximum SOC level (the recommended upper limit for SOC to minimize degradation over time).

In some embodiments, by utilizing this approach, the AI recommendation engine 612 provides effective recommendations that may address the unique characteristics and requirements of each group, which may increase lifespan and minimize performance reduction across the fleet.

Figure 12:
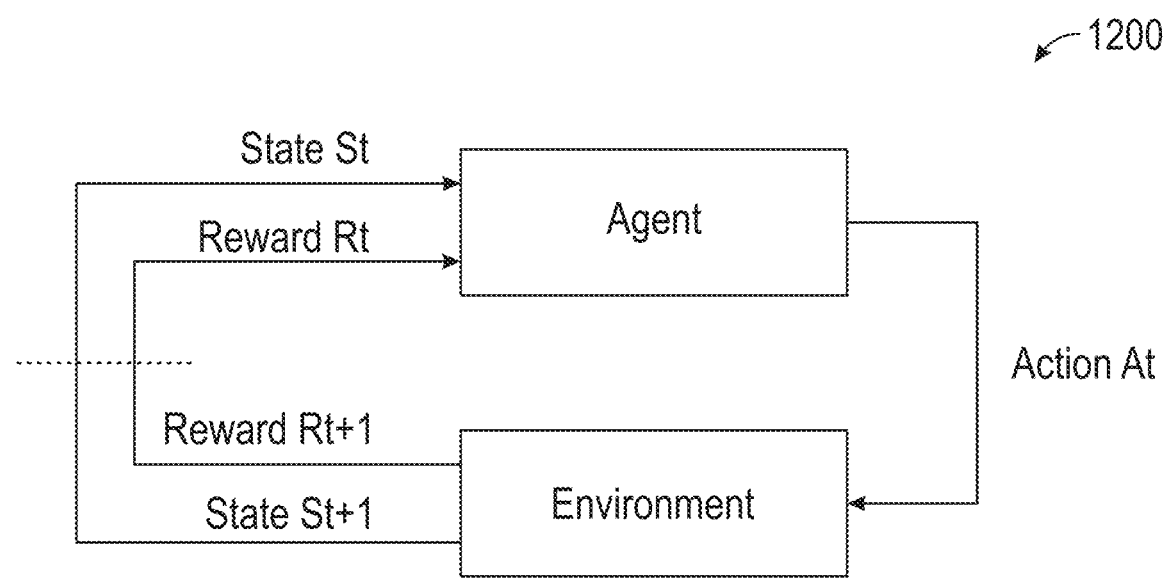
FIG. 12 illustrates an example flow chart for performing reinforcement learning according to certain embodiments of this disclosure.

FIG. 12 illustrates an example flow chart 1200 for performing reinforcement learning according to certain embodiments of this disclosure. Reinforcement learning may refer to a learning paradigm where self-learning agents optimize their actions based on rewards from interactions with the environment. At each time step, an agent receives a new observation $S_i$ from the environment and selects an action At. This action leads to another observation $S_{i+1}$ and a reward R: +1. These elements form a tuple (S.A.T,R) used to model the Markov decision process (MDP).

In the model-free setup, the transition function $T(s,a,s')=P[S_{t+1}=s' | S_t=s, A_t=a]$ is unknown, so the agent aims to find the best action set (policy: x) to maximize the reward without knowing the environment's dynamics. For a finite horizon H, the problem is defined as:

$$\pi^* = \arg\max_\pi \mathbb{E}\left[\sum_{t=0}^{H} R_t(S_t, A_t, S_{t+1}) \,\Big|\, \pi\right]$$

Unlike model-free RL, model-based RL algorithms learn the transition distribution (or state transition model) from observations. Using a parametric function approximator $p^{\hat{\phi}}(s'|s,a)$, the dynamics of the environment can be learned by maximizing the log-likelihood of the parameters $\phi$ of the transition distribution.

Deep Reinforcement Learning (DRL) combines RL with deep learning to handle high-dimensional and complex environments. Deep Q-Network is a pioneering algorithm in the field of deep reinforcement learning that combines Q-learning with deep neural networks.

Q-learning is a value-based technique that estimates the optimal action-value function Q*(s,a) given by:

$$Q^*(s,a) = \mathbb{E}\left[r + \gamma \max_{a'} Q^*(s',a') | s,a\right]$$

The Q function determines the expected future reward of each action in a particular state. By calculating the Q value for each possible state-action pair and using the Bellman optimality equation, the optimal policy can be attained by choosing actions with maximum Q values. However, Q-learning struggles with environments that have large, continuous state-action pairs due to computational burdens.

Starting with the Deep Q Network (DQN), which approximates the Q function using deep neural networks and large experience-replay buffers, improvements have been made to handle larger state-action spaces.

Figure 13:
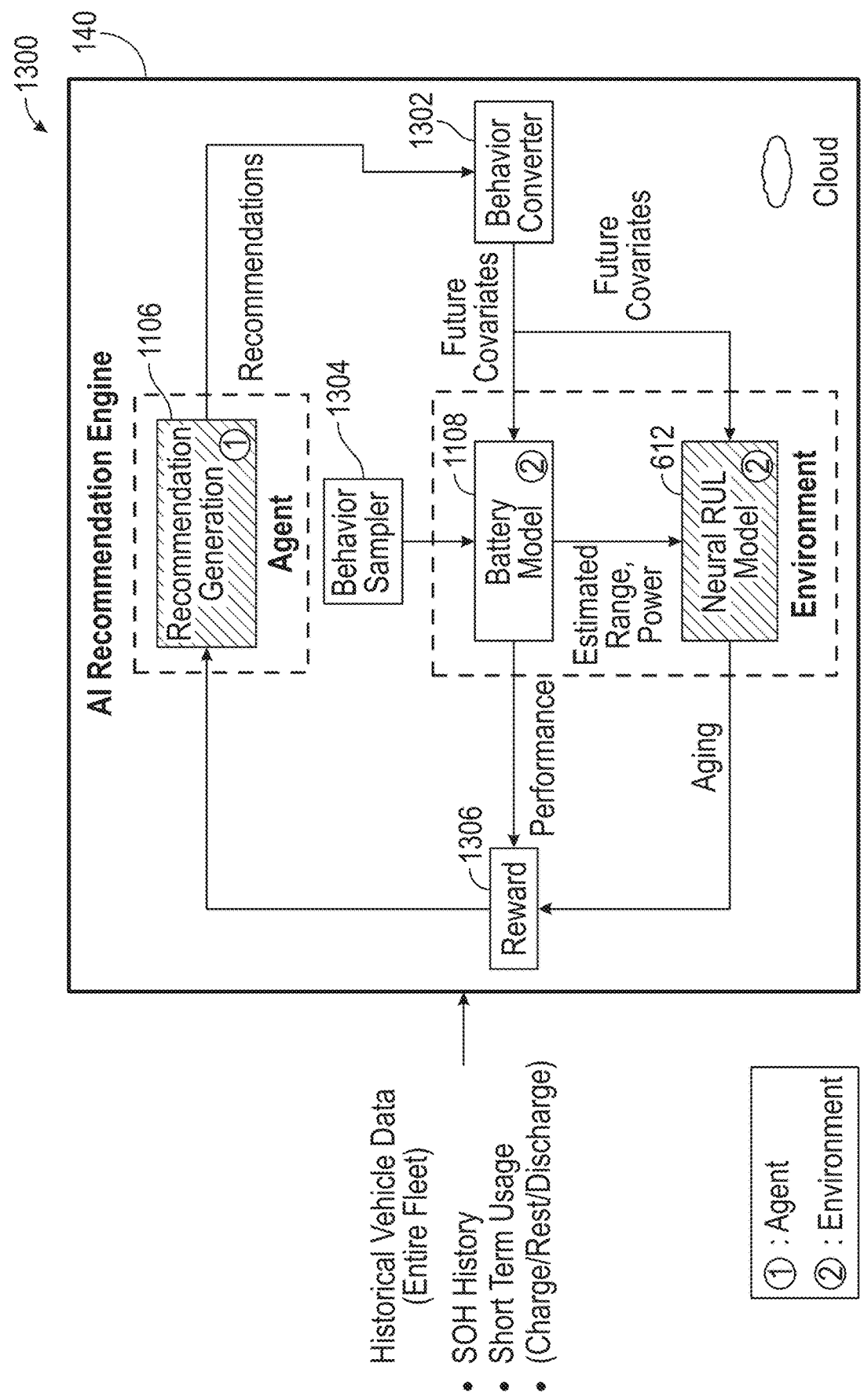
FIG. 13 illustrates an example flow chart of an AI recommendation engine according to certain embodiments of this disclosure.

FIG. 13 illustrates an example flow chart 1300 of an AI recommendation engine 140 according to certain embodiments of this disclosure. The AI recommendation engine 140 may be trained in tandem with the neural RUL model 612 model and battery model 1108, leveraging reinforcement learning (RL) techniques to enhance longevity and reduce performance minimization, in some embodiments.

As shown in the figure, the recommendation generation model 1106 serves as an agent, while the battery model 1108 and the neural RUL model 612 serve as the environment. The battery model 1108 may be implemented in computer instructions stored on one or more memory devices and executed by one or more processing devices. In some embodiments, the battery model 1108 may be a mathematical model of the battery.

A behavior converter 1302 may be implemented in computer instructions stored one or more memory devices and executed by one or more processing devices. The battery model 1108 may receive the recommendations (actions) from the recommendation generation model 1106 and convert them into concrete usage patterns that can be applied to the environments (battery model 1108 and the neural RUL model 612).

A behavior sampler 1304 may be implemented in computer instructions stored one or more memory devices and executed by one or more processing devices. The behavior sampler 1304 may generate diverse mission profiles based on predefined parameters. It provides variability in training scenarios by simulating different types of user behaviors and environmental conditions.

In some embodiments, the recommendation serves as a future covariate, meaning it assesses what the battery's remaining useful life would be if used under the recommended conditions. On the other hand, the recommendation is used to calculate power and energy consumption if the battery operates under the recommended conditions.

Based on a recommendation, which functions as an action, the environment models (neural RUL model 612 and battery model 1108) provide RUL and power estimation (insights into the battery's remaining useful life and power output under the given action).

The AI recommendation engine 140 may operate in tandem with the neural RUL model 612 and battery model 1108, leveraging reinforcement learning techniques to enhance longevity and reduce performance minimization. The neural RUL model 612 may provide an estimate of how much longer a battery is expected to function before it reaches the end of its useful life. This interaction may serve as an aspect of the reinforcement learning process. The reinforcement learning (RL) agent may receive feedback from the neural RUL model 612 in the form of a reward signal 1306. This reward signal 1306 indicates how well the agent's actions are aligning with the goal of prolonging battery life. Specifically, in some embodiments, if the neural RUL model 612 predicts a longer remaining useful life, the RL agent receives a higher reward. This indicates that the agent's actions are leading to better battery health and longevity. Higher RUL indicates a longer duration until the SOH reaches 80%. For example, if the RUL of a battery is predicted to be 4 years based solely on historical data, but with recommendations it's predicted to be 5 years, it is understood that recommendations help increase the battery's lifespan. Conversely, if the neural RUL model 612 predicts a shorter remaining useful life, the RL agent receives a lower reward. This signals that the agent's actions may be causing accelerated battery degradation.

The battery model 1108 may estimate various parameters related to the battery's performance, such as power consumption, energy usage, etc. This interaction provides valuable information to the RL agent about the current state of the battery and the consequences of its actions. Specifically, in some embodiments, higher power estimations may indicate efficient performance under certain conditions. However, if power estimations remain consistently high, it could suggest excessive strain on the battery, potentially leading to accelerated degradation. Energy usage factors also influence battery health and performance. The RL agent considers these estimations when making decisions to ensure that actions taken may optimize both short-term performance and long-term battery health.

The objective of the RL agent may be to optimize both battery performance and longevity. In some embodiments, this may be achieved through a process of iterative learning and decision-making. The RL agent may aim to find a policy that maximizes cumulative rewards over time, considering both objectives (e.g., performance improvements and extending battery lifespan). In some embodiments, implementing a multi-objective approach, the system may minimize performance degradation while also improving longevity. Specifically, prolonging lifespan typically leads to reduced performance, so that trained RL policy would learn maximized lifetime with minimized performance degradation since RL algorithms are powerful multi-objective, non-linear decision-making algorithms. It does so by learning from interactions with the neural RUL model 612 and the battery model 1108, adjusting its actions to achieve the optimal trade-off between these objectives.

In this framework, recommendations are sent to the battery model 1108 and the neural RUL model 612, representing the environment. Rewards may be obtained from both, reflecting immediate performance outcomes from the battery model 1108 and long-term battery health from the neural RUL model 612. In some embodiments, the use of two different reward components may enable a balance between optimizing battery life and performance.

Detailed steps for RL training may include initializing parameters and environment by setting initial parameters for the model (e.g., AI recommendation engine 140, neural RUL model 612, battery model 1108), including learning rates, discount factors, and exploration strategies. Further, the battery model 1108 and the neural RUL model 612 prediction components may be initialized.

Then, the RL training may proceed to state representation which includes long-term behavior (SOH history, representing how the battery's overall health has changed over time), and short-term usage (charge/rest/discharge patterns, representing recent usage behaviors and their immediate impact on the battery).

The RL training may define an action space by determining the range of possible actions for SOC limits and charge/discharge C-rates. In some embodiments, since a discrete action reinforcement learning approach is employed, the action space may be predefined to accommodate specific battery constraints, such as maximum SOC limits defined by the battery datasheet.

The rewards in the RL training may be based on metrics reduced degradation rate, extended cycle life, and energy efficiency. The reward from the battery model 1108 may reflect immediate performance-related outcomes (performance in formula), such as power efficiency or temperature stability. The reward from the neural RUL model 612 (aging in formula) may represent the long-term health impact of the action on battery lifespan. R=w1×aging+w2×performance (w1, w2 are hyperparameters to control the trade off between lifetime increase versus performance loss).

The RL training may use the behavior sampler to generate diverse mission profiles. Each mission profile should represent different operational scenarios, such as various driving patterns and charging behaviors.

For each mission, the RL training may initialize the state of the battery at a random aging point. In some embodiments, a DQN algorithm may be used to start training the policy. In some embodiments, actions may be applied according to the policy and the resulting state transitions and rewards may be observed.

In some embodiments, the RL training may simulate the battery's operation under the chosen policy until end of life (EOL). Data may be collected on the battery's state transitions, actions taken, and rewards received.

In some embodiments, the RL training may use the collected data to update the deep reinforcement learning policy. The RL training may apply techniques such as experience replay and target networks to stabilize training. Further, in some embodiments, the sampling of new missions and training cycles may be iteratively repeated to ensure the policy can handle various scenarios. The RL training may continuously monitor performance metrics and adjust hyperparameters as needed.

Figure 14:
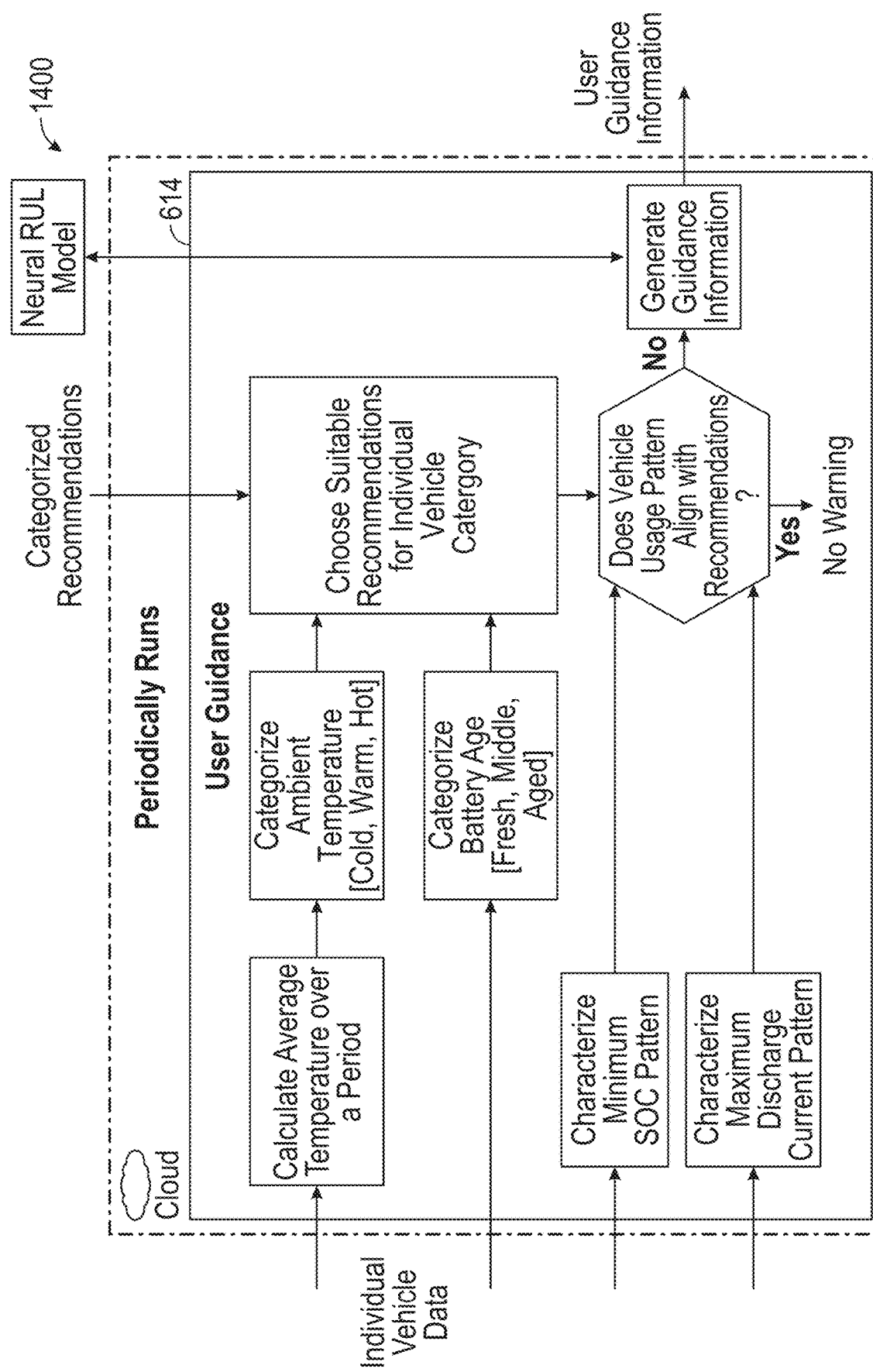
FIG. 14 illustrates an example flow chart for generating user guidance according to certain embodiments of this disclosure.

FIG. 14 illustrates an example flow chart 1400 for generating user guidance according to certain embodiments of this disclosure. The user guidance model 614 is a model designed to provide a guidance information for users. It may utilize individual vehicle data and fleet-wise recommendations from the AI recommendation engine 140.

The user guidance model 614 may determine the vehicle category. Upon receiving fleetwise (categorized) recommendations, the guidance model 614 categorizes each vehicle based on its age and operating temperature. This categorization helps in selecting the most suitable recommendation from the fleetwise recommendations for each vehicle.

The guidance model 614 may select suitable recommendation. Using the determined vehicle category, the guidance model 614 selects the most appropriate recommendation from the fleetwise recommendations. This recommendation is tailored to the specific characteristics of the vehicle category such as AGED [SOH 85%<, WARM (>15-<35)].

The guidance model 614 may characterize minimum SOC and maximum discharge current patterns. The guidance model 614 analyzes the historical data of each vehicle to characterize its minimum SOC pattern and maximum discharge current pattern over a certain period.

The guidance model 614 may compare patterns with recommendations. The guidance model 614 compares the characterized minimum SOC pattern and maximum discharge current pattern with the corresponding recommendations obtained from the fleetwise recommendations. If the patterns deviate significantly from the recommended values, it indicates potential areas for improvement in battery management practices.

Figure 15:
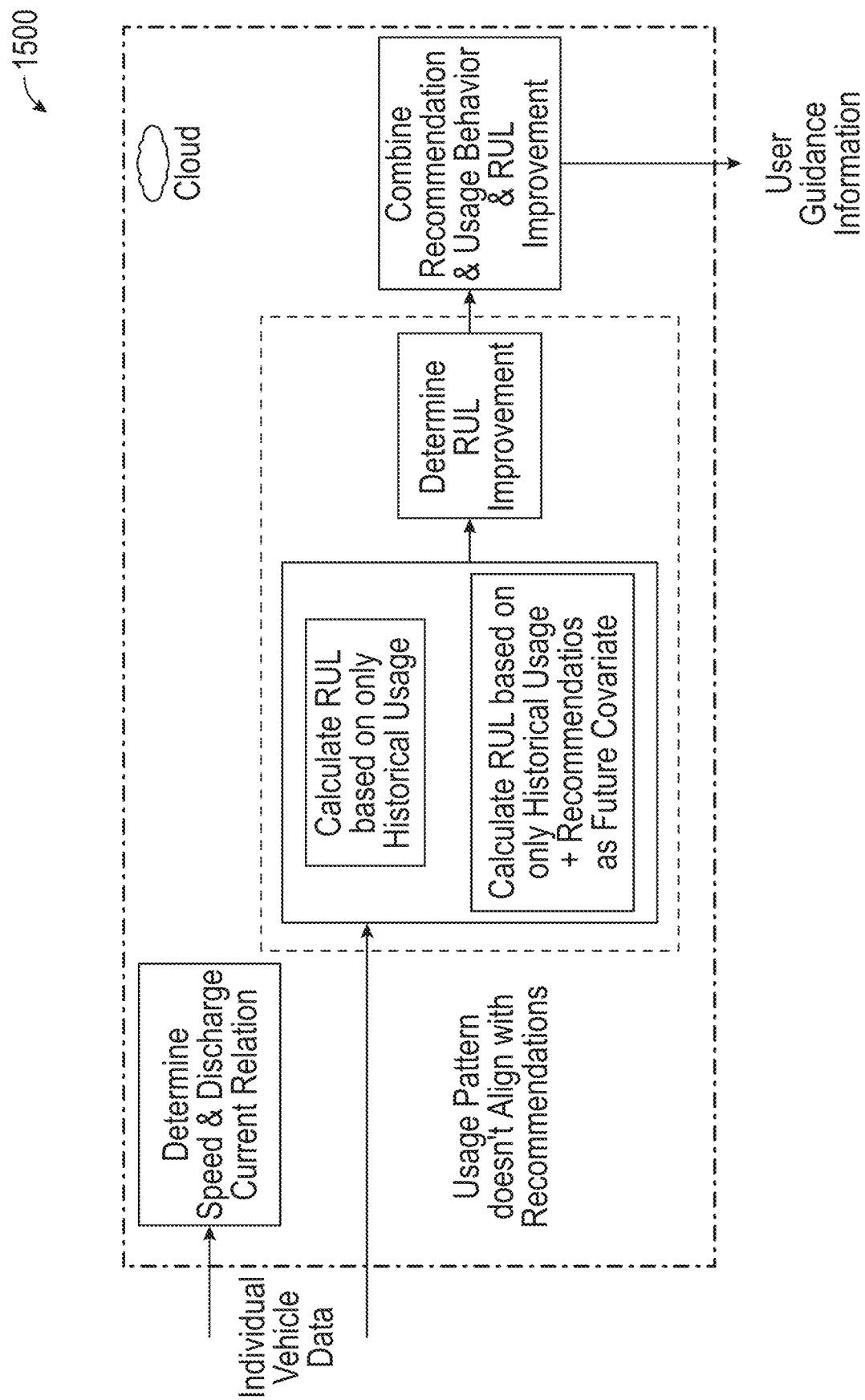
FIG. 15 illustrates another example flow chart for generating user guidance according to certain embodiments of this disclosure.

FIG. 15 illustrates another example flow chart 1500 for generating user guidance according to certain embodiments of this disclosure. If the usage pattern deviates from the recommended minimum SOC and maximum discharge values, guidance information may be generated. Guidance information include estimated metrics such as "Reducing your average speed to xxx miles would extend your battery lifespan by 9 months".

For example, steps to perform guidance information may include 1) if the usage pattern does not align with the recommendations, the remaining useful life of the vehicle is first calculated based solely on historical usage (this provides a current RUL estimate), 2) then, the RUL is recalculated by considering the recommendations (discharge current and minimum SOC) as future covariates (this gives us RUL if recommendations are followed), 3) the difference between two rules provides values for longevity if guidance is followed. EG: "Following our min SOC recommendation will extend life of your battery by 11 months", 4) additionally, the relationship between the vehicle's speed and discharge current is calculated. To warn the user about discharge current, it provides alerts based on speed using recorded values of C-rate versus speed, which may enable the user to directly understand the implications. To establish the relationship between speed and average discharge current, historical data on speed and discharge current over time of the vehicle is utilized, in some embodiments. Average discharge current is calculated for each speed range, and the lookup table is then filled accordingly. In other words, some embodiments may relate discharge rate to speed by generating or building a lookup table for a vehicle group.

TABLE 1

| Speed (km/h) | Average Discharge Current (A) |
| --- | --- |
| 0-20 | 10 |
| 21-40 | 15 |
| 41-60 | 20 |
| 61-80 | 22 |
| 81-100 | 25 |
| 101-120 | 27 |
| 121-140 | 30 |
| 141-160 | 38 |
| 161-180 | 45 |
| 181-200 | 55 |

For "speed" and "Discharge Current, Discharge C-rate" relationship is derived from recorded data for a particular vehicle group. This approach enables the determination of the suitable speed based on the observed discharge current pattern. 5) Finally, by using recommendations, historical usage and RUL improvement are combined. Thus, guidance information is created to show the user how much the vehicle's lifespan will be extended by changing the minimum SOC level and adjusting speed.

Figure 16:
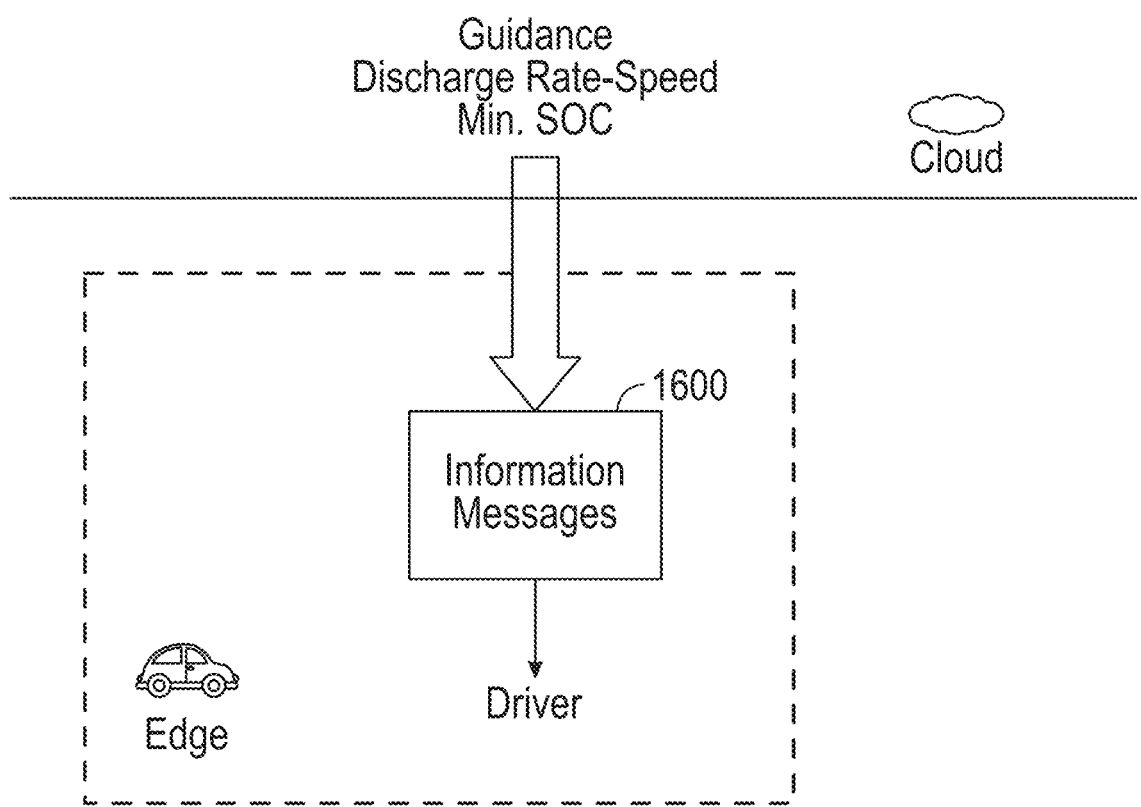
FIG. 16 illustrates an example of user guidance driver display at the edge vehicle according to certain embodiments of this disclosure.

FIG. 16 illustrates an example of user guidance driver display 1600 at the edge vehicle according to certain embodiments of this disclosure. The user guidance model is a system designed to provide estimated metric-based guidance information for users. It utilizes individual vehicle data and fleet-wise recommendation from AI recommendation engine 140. The list of example information messages are listed below.

Sample List of User Guidance Information Messages: 1) Minimum SOC Deviation Alert Example Message: Your battery's minimum State of Charge is below the recommended level. Maintaining the minimum SOC level above 20% can extend battery life. If you discharge the battery to only 20% instead of 15%, your battery will last 9 months longer; 2) Maximum Discharge Current Exceedance Example Message: Your battery's maximum discharge current exceeds the recommended limit. Please consider reducing the maximum speed (180 km/h) to (130 km/h). Maximum speed of 130 km/h will make your battery last 20 more months.

As depicted, the messages contain numerically estimated metrics of lifespan upon certain actions.

Figure 17:
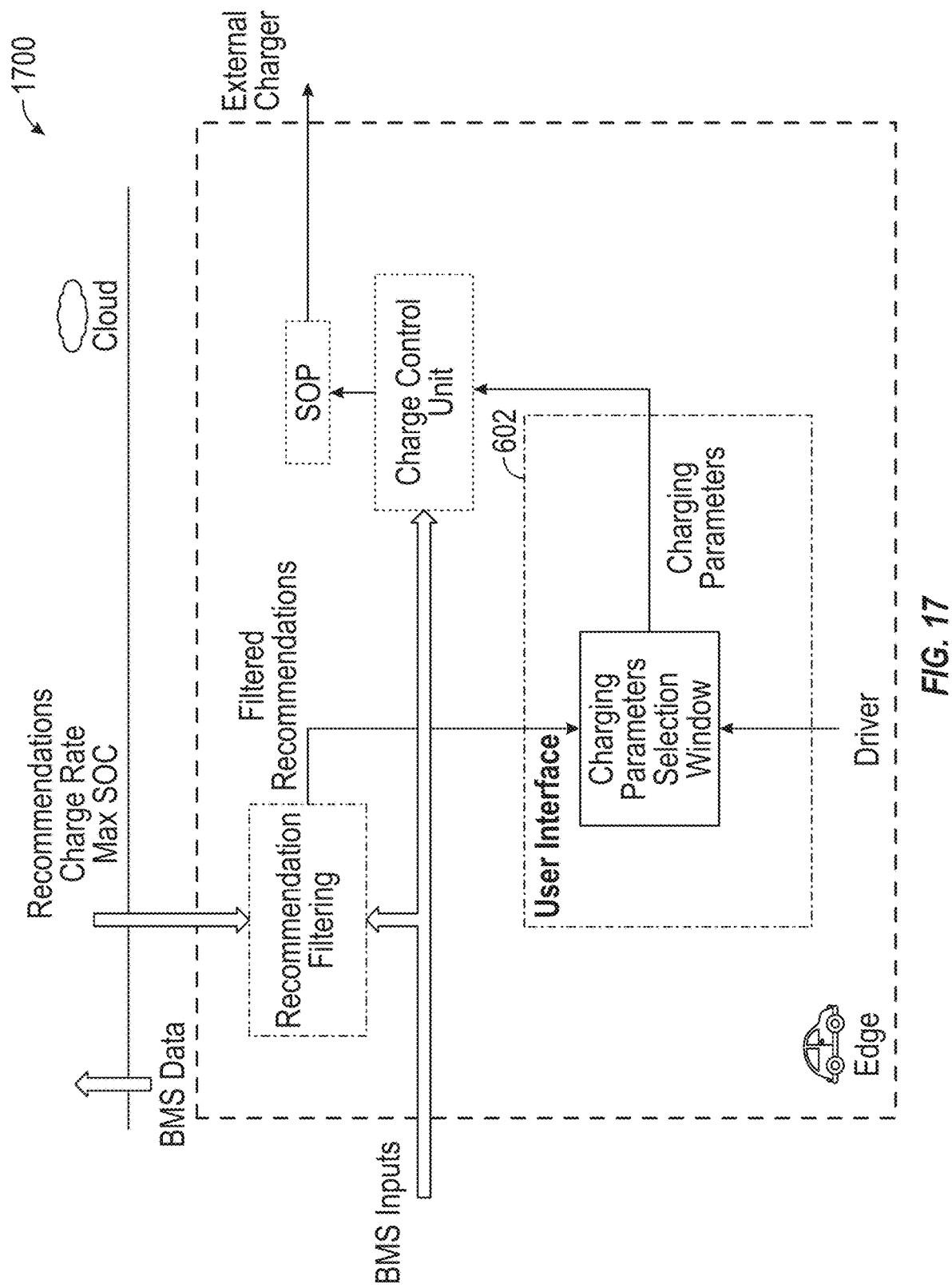
FIG. 17 illustrates an example charging flow chart at the edge vehicle according to certain embodiments of this disclosure.

FIG. 17 illustrates an example charging flow chart 1700 at the edge vehicle according to certain embodiments of this disclosure. The AI recommendations engine 140 transmits out fleet wise recommendations for charging for all categories [Age & Temp] to all vehicles. The charging recommendations include: Charge Speed: Optimum, Fast; Maximum SOC: Recommended, User Defined target.

Figure 18:
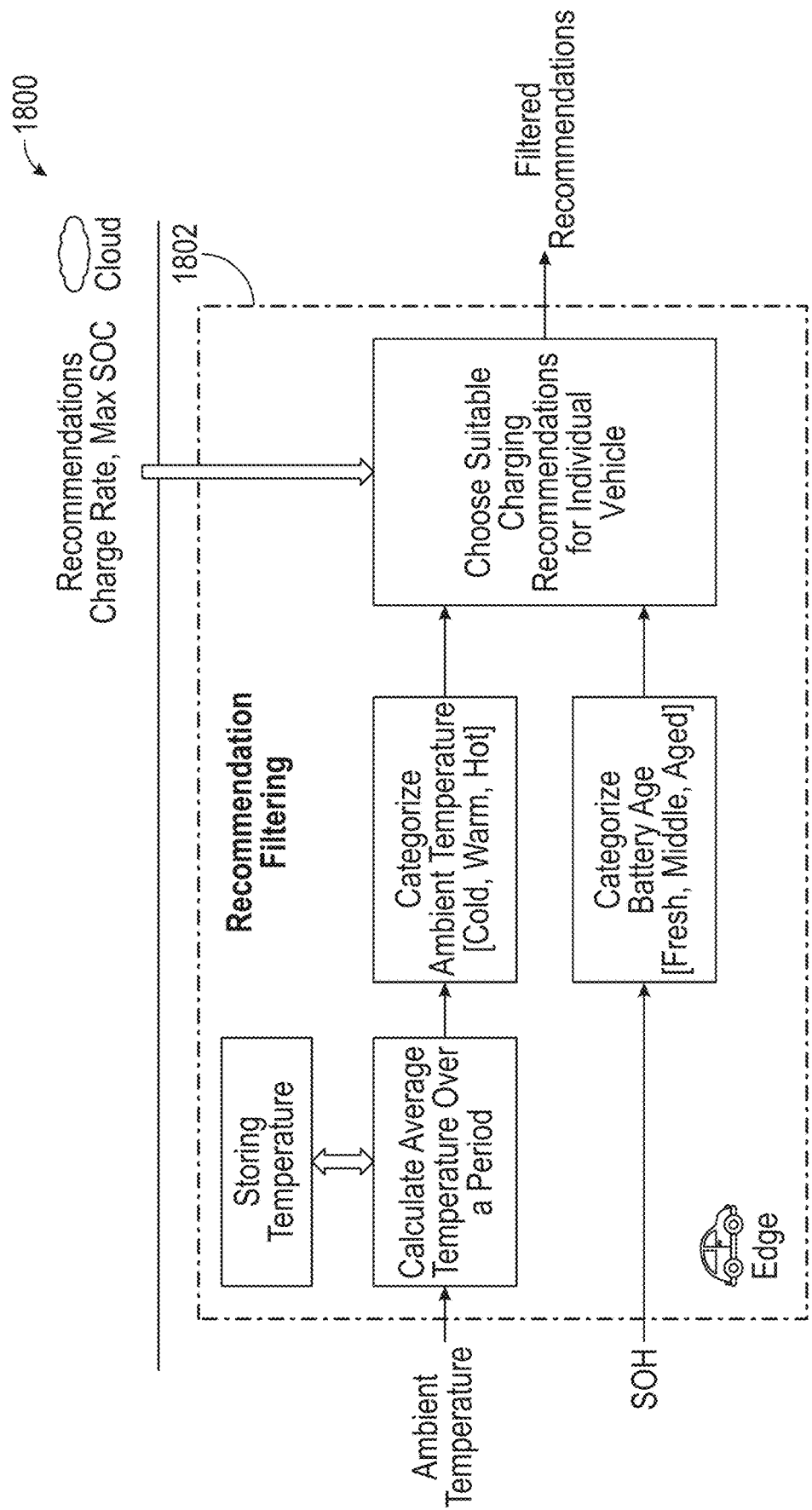
FIG. 18 illustrates an example flow chart for performing recommendation filtering according to certain embodiments of this disclosure.

FIG. 18 illustrates an example flow chart 1800 for performing recommendation filtering according to certain embodiments of this disclosure. Recommendations generated at the fleet level may be sent to each vehicle from the cloud-based computing system. The recommendation filtering module 1802 plays a role in customizing and refining the recommendations received from the cloud, tailoring them to the specific needs and conditions of each vehicle in the fleet.

The recommendation filtering module 1802 retrieves SOH and temperature data from the BMS and receives fleet-wise recommendations from the cloud-based computing system. The recommendation filtering module 1802 applies a filtering process to customize the fleet-wise recommendations for each vehicle. This may involve considering the unique characteristics and condition of the vehicle's battery. The recommendation filtering module 1802 categorizes the battery based on its age using the received SOH values [Fresh, Middle-Aged, Aged] and average ambient temperature values over a specific period [Cold, Warm, Hot]

Considering both battery age and ambient temperature conditions, the recommendation filtering module 1802 filters recommendations for each vehicle. These recommendations originate from the cloud-based computing system and vary from group to group.

Figure 19:
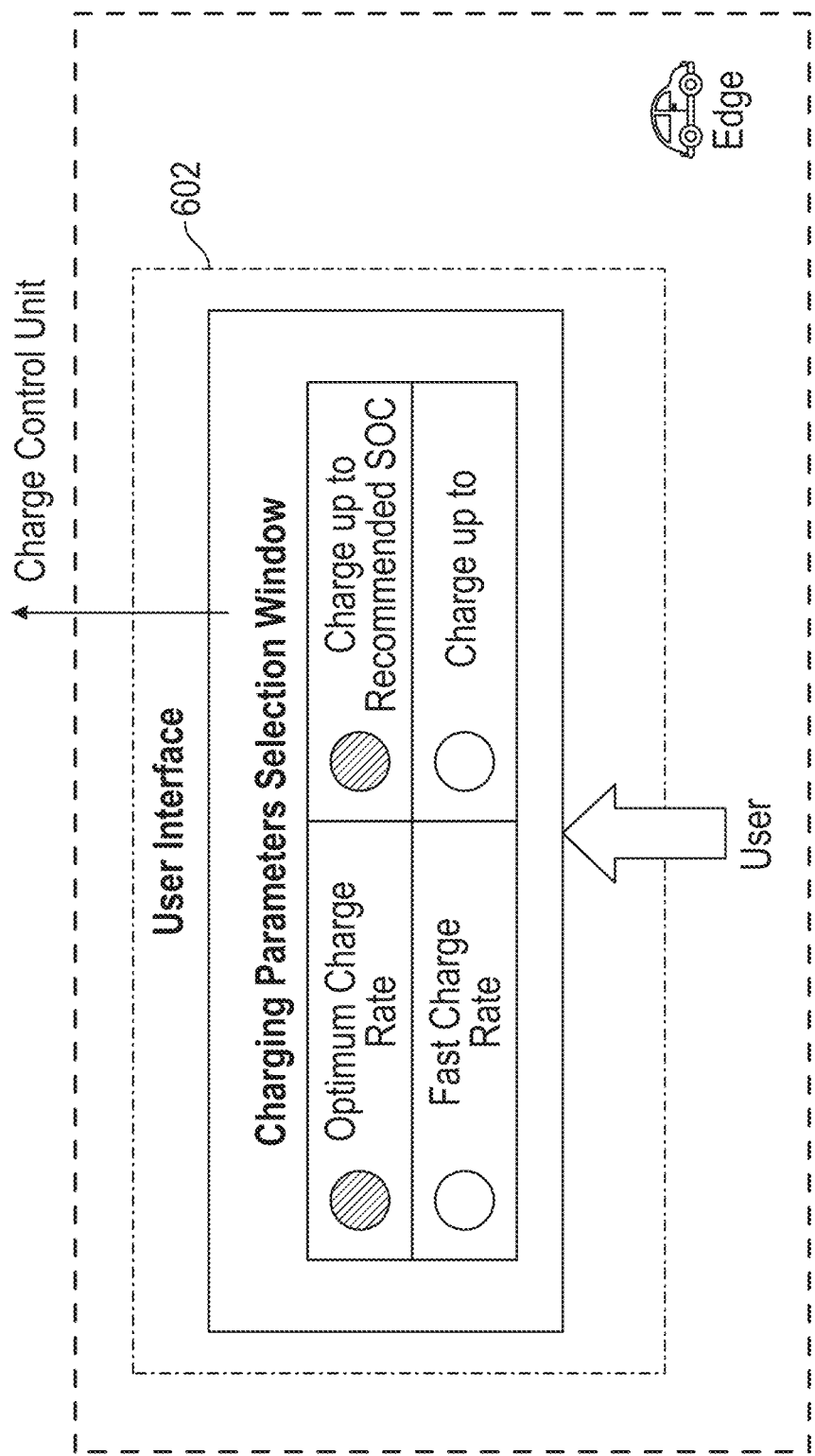
FIG. 19 illustrates an example of a user interface according to certain embodiments of this disclosure.

FIG. 19 illustrates an example of a user interface 602 according to certain embodiments of this disclosure. The user interface 602 serves as a point of interaction between the driver and the vehicle's charging system, providing information, warnings, and customization options. A charging parameters selection window may facilitate user engage by allowing the driver to choose the desired charging rate from predefined options, including: optimum charging rate as recommended by the AI recommendation engine 140, and fast charging rate.

The driver can select the target SOC to which the battery should be charged. The available options include: Charging up to recommended SOC: AI recommendation engine recommends "Optimum SOC" Opting for a SOC recommended to prolong battery lifespan, Charging up to . . . : Allowing the driver to manually input the desired SOC value.

In some embodiments, other options include: Charging Scheduling, Finish Charging By can be integrated into User Interface allowing the User/Driver wider range of choices in line with specific lifestyle requirements of the driver. When such choices are included in User Interface, a "Hierarchical Choice Model" may be deployed For example; When "Finish Charging by" specifies and end time, prioritizing "charge rate" over "Optimum SOC" would charge the battery at Optimum Rate and may not reach "Optimum SOC" level recommended by AI-RE. Many useful choices may be incorporated to charge parameters selection window expanding user choice. "Hierarchical Choice Model" operating in the background would make the most beneficial choices for battery lifespan remaining within user/driver requests.

The user interface 602 may empower the driver to make informed decisions regarding charging preferences based on their individual requirements and priorities.

Figure 20:
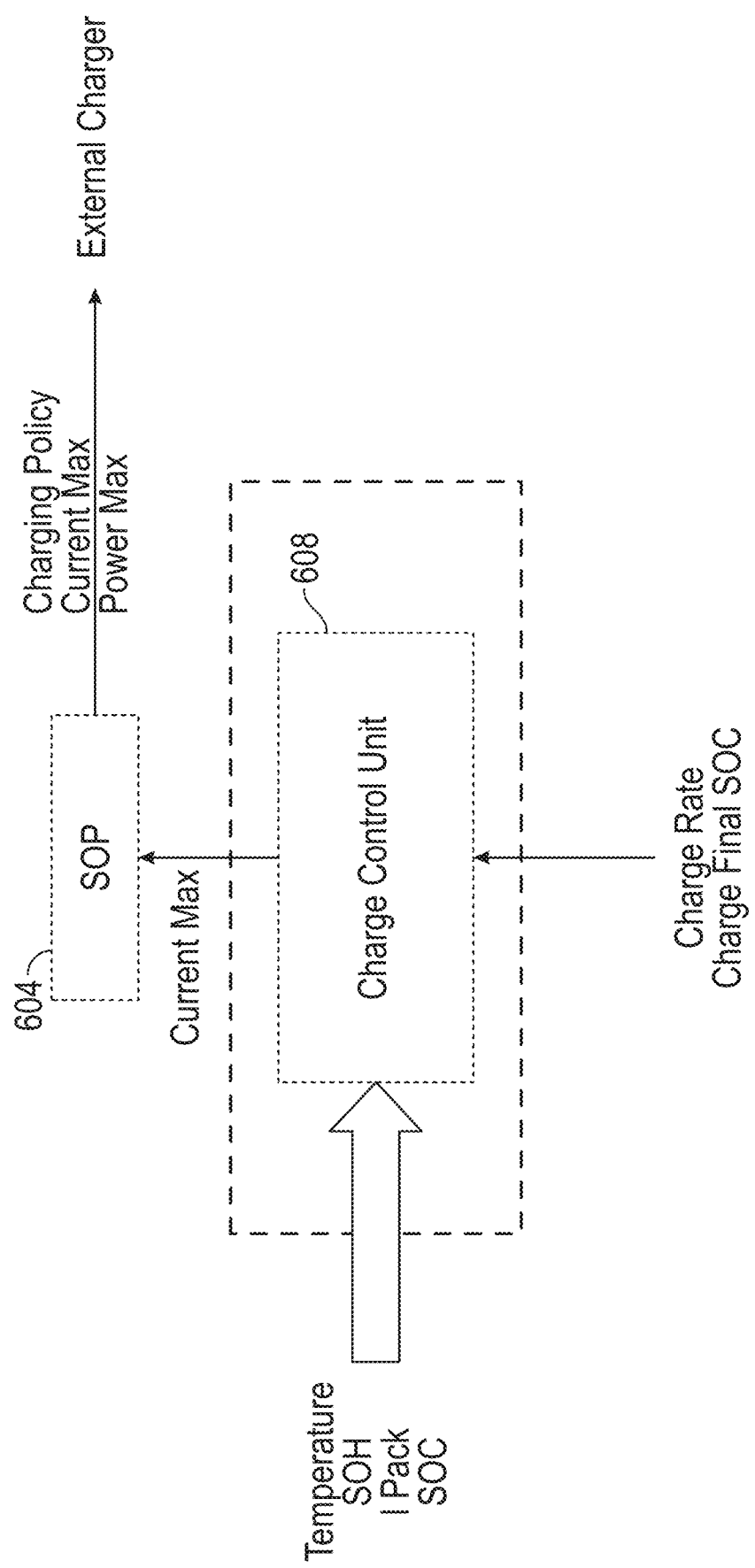
FIG. 20 illustrates an example charge control unit according to certain embodiments of this disclosure.

FIG. 20 illustrates an example charge control unit 608 according to certain embodiments of this disclosure. The charge control unit 608 manages the charging process of the vehicle's battery, integrating inputs from both the BMS and the user interface to optimize charging parameters.

The charge control unit 608 receives inputs from the BMS, including temperature, SOC, pack current, and timestamp. Additionally, it receives selected charging parameters from the user interface, such as the chosen charge rate, and final SOC target.

Based on the user's selection in the user interface, the charge control unit 608 adjusts the charging rate accordingly. For example, if the user opts for a fast charging rate, the unit adjusts the rate to facilitate faster charging, ensuring it remains within the safe limits specified for the battery or external charger. If the user chooses the recommended charging rate, the charge control unit 608 aligns the charging rate with the optimal rate suggested by the engine.

In some embodiments, the charge control unit 608 aligns the charging rate automatically based on a recommendation from the AI recommendation engine 140 without user input.

The charge control unit 608 may modify the final SOC target based on the user's selection in the UI. For instance, if the user manually selects a final SOC, the unit ensures that the charging cycle concludes once the battery reaches that state. For instance, if the user selects a final SOC of 100%, the unit ensures that the charging cycle concludes once the battery reaches a full charge. If the user opts for charging up to the recommended SOC, the unit monitors and manages the charging process to achieve the SOC value recommended.

In some embodiments, the charge control unit 608 may modify the final SOC target based on the recommendation from the AI recommendation engine 140.

By dynamically adjusting charging parameters in response to user preferences, operational requirements, and recommendations, the charge control unit 608 ensures that the transmission of optimized parameters such as timing and C-rate to SOP, which are subsequently communicated to the external charger.

State of Power (SOP) 604 is the software function that determines and publishes "Available" charge. SOP also publishes discharge power (or current/voltage) limits (e.g. instantaneous and/or peak) over with one or more defined time horizon(s) such as 2 seconds, 10s, 30s, 60s etc.) to ensure the performance availability, and lifetime of a battery. These calculations are based on current operating conditions such as ambient/battery temperature(s), state-of-charge, voltage and temperature of the cells and/or battery pack, C-rate/pack current, limits on these current operating conditions (upper and lower limits on cell/pack voltage, temperatures, pack current and cell/pack SOC) recent or predicted battery pack current/power, state of the battery pack (whether it is charging, discharging/use or in a "sleep" i.e., inactive, mode), any existing or potential battery errors and faults etc.

SOP function is typically responsible for implementing the charging policy of a battery by publishing the relevant charge power (or current/voltage) limits to the charge controllers. For instance: (i) When charging begins: The charge control unit provides the maximum charge current based on selection; (ii) SOP adjusts the charging policy based on this value.

Figure 21:
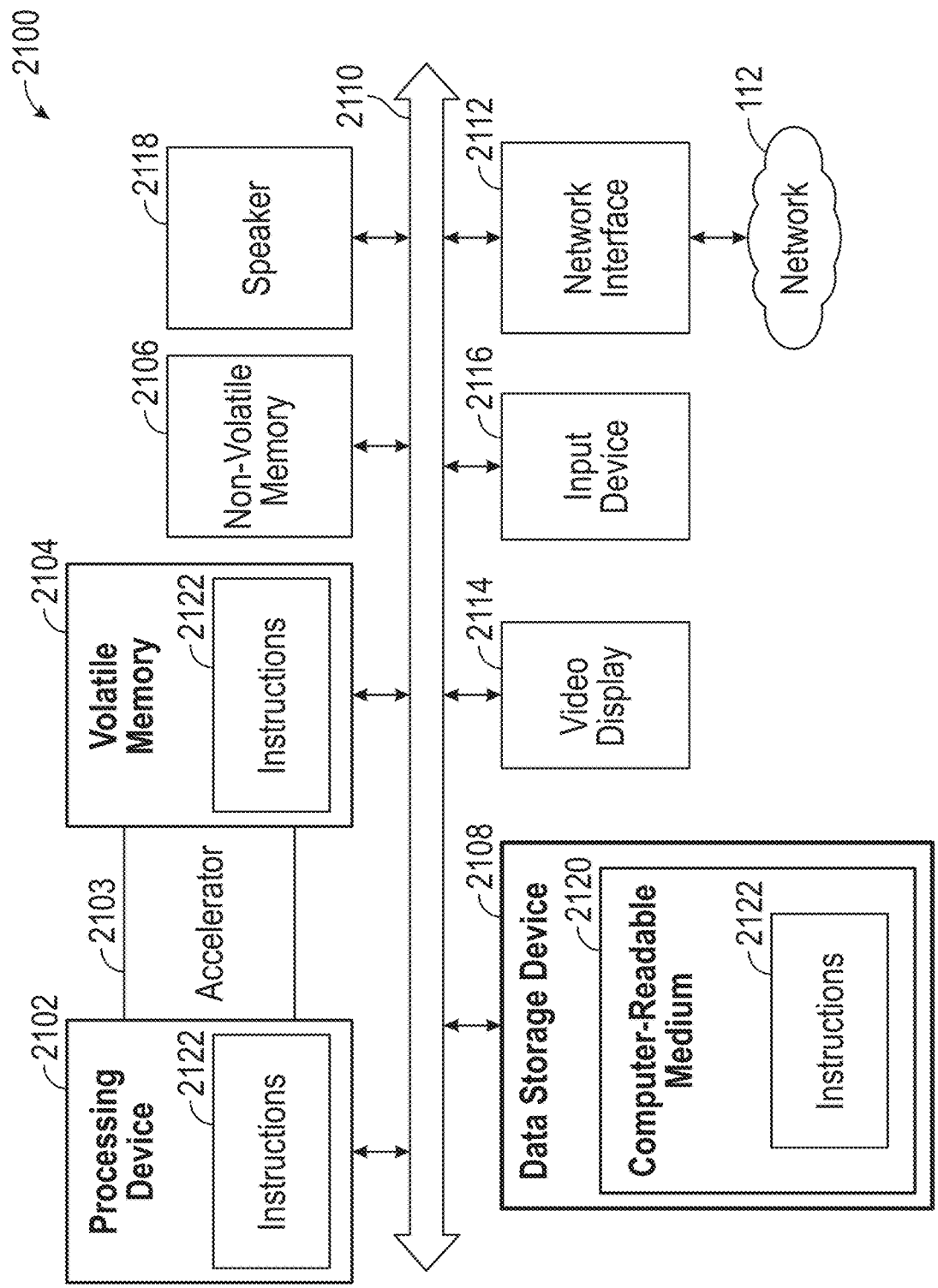
FIG. 21 illustrates an example computer system according to certain embodiments of this disclosure.

FIG. 21 illustrates example computer system 2100 which can perform any one or more of the methods described herein, in accordance with one or more aspects of the present disclosure. In one example, computer system 2100 may correspond to the computing device 102 (e.g., user computing device), computing device 103, one or more servers 128 of the cloud-based computing system 116, the artificial intelligence engine 140, the training engine 130, any component of the vehicle 117, or any suitable component of FIG. 1. The computer system 2100 may be capable of executing the one or more machine learning models 132 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 2100 includes a processing device 2102, a volatile memory 2104 (e.g., random access memory (RAM)), a non-volatile memory 2106 (e.g., read-only memory (ROM), flash memory, solid state drives (SSDs), and a data storage device 2108, the foregoing of which are enabled to communicate with each other via a bus 2110.

Processing device 2102 represents one or more general-purpose processing devices such as a microprocessor, central processing unit, or the like. More particularly, the processing device 2102 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 2102 may also be one or more special-purpose processing devices such as an application specific integrated circuit (ASIC), a system on a chip, a field programmable gate array (FPGA), a digital signal processor (DSP), network processor, or the like. The processing device 2102 may include more than one processing device, and each of the processing devices may be the same or different types. The processing device 2102 may include or be communicatively coupled to one or more accelerators 2103 configured to offload various data-processing tasks from the processing device 2102. The processing device 2102 is configured to execute instructions for performing any of the operations and steps discussed herein.

The computer system 2100 may further include a network interface device 2112. The network interface device 2112 may be configured to communicate data via any suitable communication protocol. In some embodiments, the network interface devices 2112 may enable wireless (e.g., WiFi, Bluetooth, ZigBee, etc.) or wired (e.g., Ethernet, etc.) communications. The computer system 2100 also may include a video display 2114 (e.g., a liquid crystal display (LCD), a light-emitting diode (LED), an organic light-emitting diode (OLED), a quantum LED, a cathode ray tube (CRT), a shadow mask CRT, an aperture grille CRT, or a monochrome CRT), one or more input devices 2116 (e.g., a keyboard or a mouse), and one or more speakers 2118 (e.g., a speaker). In one illustrative example, the video display 2114 and the input device(s) 2116 may be combined into a single component or device (e.g., an LCD touch screen).

The output device 2150 may transmit and receive data from a computer system application programming interface (API). The data may pertain to any suitable information described herein, such as a remaining useful life of a battery pack, among other information.

The data storage device 2108 may include a computer-readable medium 2120 on which the instructions 2122 embodying any one or more of the methods, operations, or functions described herein is stored. The instructions 2122 may also reside, completely or at least partially, within the volatile memory 2104 or within the processing device 2102 during execution thereof by the computer system 2100. As such, the volatile memory 2104 and the processing device 2102 also constitute computer-readable media. The instructions 2122 may further be transmitted or received over a network via the network interface device 2112.

While the computer-readable storage medium 2120 is shown in the illustrative examples to be a single medium, the term "computer-readable storage medium" should be taken to include a single medium or multiple media (e.g., a centralized or distributed database, or associated caches and servers) that store the one or more sets of instructions. The term "computer-readable storage medium" shall also be taken to include any medium capable of storing, encoding, or carrying a set of instructions for execution by the machine, where such set of instructions cause the machine to perform any one or more of the methodologies of the present disclosure. The term "computer-readable storage medium" shall accordingly be taken to include, but not be limited to, solid-state memories, optical media, and magnetic media.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle.

Consistent with the above disclosure, the examples of systems and method enumerated in the following clauses are specifically contemplated and are intended as a non-limiting set of examples.

1. A computer-implemented method for executing an artificial intelligence (AI) engine, comprising:
   executing, by the AI engine, a categorization model configured to categorize, into a plurality of categories, a plurality of vehicles based on a plurality of factors comprising age, temperature conditions, usage patterns, battery health metrics, or some combination thereof;
   executing, by the AI engine, a behavior analysis model configured to analyze behavior of the plurality of vehicles in each of the plurality of categories to identify battery performance metrics comprising charging habits, discharge rates, charge rates, state of charge, state of health, state of power, or some combination thereof;
   executing, by the AI engine, a recommendation generation model configured to generate, based on the battery performance metrics, one or more recommendations for enhancing battery management strategies, wherein the recommendation generation model accounts for a current state of a vehicle to suggest actions to improve battery health; and
   executing, by the AI engine, a battery model configured to determine power and energy consumption based on the one or more recommendations generated by the recommendation generation model.

2. The computer-implemented method of any clause herein, further comprising using the behavior analysis model to determine an average behavior for each of the plurality of categories.

3. The computer-implemented method of any clause herein, wherein the one or more recommendations comprise a minimum state of charge level, a maximum discharge rate, a maximum charge rate, a recommended upper limit for state of charge, or some combination thereof.

4. The computer-implemented method of any clause herein, wherein the recommendation generation model generates the one or more recommendations for enhancing battery management strategies without decreasing power or energy capabilities of batteries.

5. The computer-implemented method of any clause herein, further comprising:
   executing, by the AI engine, a behavior converter configured to receive the one or more recommendations from the recommendation generation model and convert the one or more recommendations into a battery usage pattern that is applied to a battery model and a neural remaining useful life model.

6. The computer-implemented method of any clause herein, further comprising:
   executing, by the AI engine, a behavior sampler configured to generate a plurality of mission profiles including different training scenarios by simulating different types of user behaviors and environmental conditions.

7. The computer-implemented method of any clause herein, wherein the recommendation generation engine receives a reward signal from a neural remaining useful life model, wherein the reward signal indicates how well the one or more recommendations generated by the recommendation generation engine align with a desired goal.

8. The computer-implemented method of any clause herein, further comprising executing, by the AI engine, the one or more recommendations to modify an operating parameter of a battery pack of the vehicle or influencing driver on his driver habits 9. The computer-implemented method of any clause herein, wherein the recommendation generation engine generates the one or more recommendations based on two categories, a first category relates to recommendations related to charging, and a second category relates to user guidance related to driver behavior.

10. A system comprising:
    a memory device storing instructions; and
    a processing device communicatively coupled to the memory device, wherein the processing device executes the instructions to:
    execute, by an artificial intelligence engine, a categorization model configured to categorize, into a plurality of categories, a plurality of vehicles based on a plurality of factors comprising age, temperature conditions, usage patterns, battery health metrics, or some combination thereof;
    execute, by the AI engine, a behavior analysis model configured to analyze behavior of the plurality of vehicles in each of the plurality of categories to identify battery performance metrics comprising charging habits, discharge rates, charge rates, state of charge, state of health, state of power, or some combination thereof;
    execute, by the AI engine, a recommendation generation model configured to generate, based on the battery performance metrics, a plurality of recommendations for enhancing battery management strategies, wherein the recommendation generation model accounts for a current state of a vehicle to suggest actions to improve battery health; and
    execute, by the AI engine, a battery model configured to determine power and energy consumption based on the one or more recommendations generated by the recommendation generation model.

11. The system of any clause herein, wherein the processing device is further to use the behavior analysis model to determine an average behavior for each of the plurality of categories.

12. The system of any clause herein, wherein the one or more recommendations comprise a minimum state of charge level, a maximum discharge rate, a maximum charge rate, a recommended upper limit for state of charge, or some combination thereof.

13. The system of any clause herein, wherein the recommendation generation model generates the plurality of recommendations for enhancing battery management strategies without decreasing power or energy capabilities of batteries.

14. The system of any clause herein, wherein the processing device further:
    executes, by the AI engine, a behavior converter configured to receive the one or more recommendations from the recommendation generation model and convert the one or more recommendations into a battery usage pattern that is applied to a battery model and a neural remaining useful life model.

15. The system of any clause herein, wherein the processing device further:
    executes, by the AI engine, a behavior sampler configured to generate a plurality of mission profiles including different training scenarios by simulating different types of user behaviors and environmental conditions.
16. The system of any clause herein, wherein the recommendation generation engine receives a reward signal from a neural remaining useful life model, wherein the reward signal indicates how well the one or more recommendations generated by the recommendation generation engine align with a desired goal.
17. The system of any clause herein, wherein the processing device further executes, by the AI engine, the one or more recommendations to modify an operating parameter of a battery pack of the vehicle or influencing driver on his driver habits
18. The system of any clause herein, wherein the recommendation generation engine generates the one or more recommendations based on two categories, a first category relates to recommendations related to charging, and a second category relates to user guidance related to driver behavior.
19. A tangible, non-transitory computer-readable media storing instructions that, when executed, cause a processing device to:
   execute, by an artificial intelligence engine, a categorization model configured to categorize, into a plurality of categories, a plurality of vehicles based on a plurality of factors comprising age, temperature conditions, usage patterns, battery health metrics, or some combination thereof;
   execute, by the AI engine, a behavior analysis model configured to analyze behavior of the plurality of vehicles in each of the plurality of categories to identify battery performance metrics comprising charging habits, discharge rates, charge rates, state of charge, state of health, state of power, or some combination thereof;
   execute, by the AI engine, a recommendation generation model configured to generate, based on the battery performance metrics, a plurality of recommendations for enhancing battery management strategies, wherein the recommendation generation model accounts for a current state of a vehicle to suggest actions to improve battery health; and
   execute, by the AI engine, a battery model configured to determine power and energy consumption based on the one or more recommendations generated by the recommendation generation model.
20. The computer-readable media of any clause herein, wherein the processing device is further to use the behavior analysis model to determine an average behavior for each of the plurality of categories.
21. A computer-implemented method comprising:
   determining a state of health (SOH) degradation rate for a battery pack, wherein the SOH degradation rate indicates how quickly the battery pack is aging;
   determining an average operating temperature of the battery pack;
   responsive to determining that the SOH degradation rate exceeds a SOH degradation rate threshold, a SOH value is below a pre-defined SOH value, and the average operating temperature exceeds a threshold temperature, identifying the battery pack as an over-aged battery pack candidate for exchange;
   pairing the over-aged battery pack candidate with an under-aged battery pack and determining whether the average operating temperature of the over-aged battery pack is higher than an ambient temperature of the under-aged battery pack; and
   generating one or more instructions to exchange one or more first battery cells of the over-aged battery pack candidate with one or more second battery cells of the under-aged battery pack.
22. The computer-implemented method of any clause herein, further comprising identifying under-aged battery packs, wherein the identifying is based on (i) aged due to calendar aging rather than use and/or (ii) consistently slowly charged and operated in warm environments, and (iii) the SOH value is higher than a pre-defined threshold.
23. The computer-implemented method of any clause herein, further comprising causing the one or more instructions to be presented on a computing device of a user.
24. The computer-implemented method of any clause herein, further comprising executing the one or more instructions using a robot to exchange the one or more first battery cells of the over-aged battery pack candidate with the one or more second battery cells of the under-aged battery pack.
25. The computer-implemented method of any clause herein, further comprising executing, by a cloud-based computing system, a neural remaining useful life (RUL) model trained using laboratory data, vehicle fleet data, or both, wherein the RUL model is configured to predict a remaining useful life of battery components, and the RUL model trains via continuous learning by comparing previous predictions with current state of health fleet data.
26. The computer-implemented method of any clause herein, further comprising executing an artificial intelligence recommendation engine to generate the one or more instructions.
27. The computer-implemented method of any clause herein, wherein a processing device employs a battery management policy to reduce battery waste and extend the life of existing batteries.
28. A system comprises:
   a memory device storing instructions; and
   a processing device communicatively coupled to the memory device, wherein the processing device executes the instructions to:
   determine a state of health (SOH) degradation rate for a battery pack, wherein the SOH degradation rate indicates how quickly the battery pack is aging;
   determine an average operating temperature of the battery pack;
   responsive to determining that the SOH degradation rate exceeds a SOH degradation rate threshold, a SOH value is below a pre-defined SOH value, and the average operating temperature exceeds a threshold temperature, identify the battery pack as an over-aged battery pack candidate for exchange;
   pair the over-aged battery pack candidate with an under-aged battery pack and determining whether the average operating temperature of the over-aged battery pack is higher than an ambient temperature of the under-aged battery pack; and
   generate one or more instructions to exchange one or more first battery cells of the over-aged battery pack candidate with one or more second battery cells of the under-aged battery pack.
29. The system of any clause herein, wherein the processing device further identifies under-aged battery packs, wherein the identifying is based on (i) aged due to calendar aging rather than use and/or (ii) consistently slowly charged and operated in warm environments, and (iii) the SOH value is higher than a pre-defined threshold.
30. The system of any clause herein, wherein the processing device further causes the one or more instructions to be presented on a computing device of a user.
31. The system of any clause herein, wherein the processing device further executes the one or more instructions using a robot to exchange the one or more first battery cells of the over-aged battery pack candidate with the one or more second battery cells of the under-aged battery pack.
32. The system of any clause herein, wherein the processing device further executes, by a cloud-based computing system, a neural remaining useful life (RUL) model trained using laboratory data, vehicle fleet data, or both, wherein the RUL model is configured to predict a remaining useful life of battery components, and the RUL model trains via continuous learning by comparing previous predictions with current state of health fleet data.
33. The system of any clause herein, wherein the processing device further executes an artificial intelligence recommendation engine to generate the one or more instructions.
34. The system of any clause herein, wherein the processing device employs a battery management policy to reduce battery waste and extend the life of existing batteries.
35. A tangible, non-transitory computer-readable media storing instructions that, when executed, cause a processing device to:
determine a state of health (SOH) degradation rate for a battery pack, wherein the SOH degradation rate indicates how quickly the battery pack is aging;
determine an average operating temperature of the battery pack;
responsive to determining that the SOH degradation rate exceeds a SOH degradation rate threshold, a SOH value is below a pre-defined SOH value, and the average operating temperature exceeds a threshold temperature, identify the battery pack as an over-aged battery pack candidate for exchange;
pair the over-aged battery pack candidate with an under-aged battery pack and determining whether the average operating temperature of the over-aged battery pack is higher than an ambient temperature of the under-aged battery pack; and
generate one or more instructions to exchange one or more first battery cells of the over-aged battery pack candidate with one or more second battery cells of the under-aged battery pack.
36 The computer-readable media of any clause herein, wherein the processing device further identifies under-aged battery packs, wherein the identifying is based on (i) aged due to calendar aging rather than use and/or (ii) consistently slowly charged and operated in warm environments, and (iii) the SOH value is higher than a pre-defined threshold.
37. The computer-readable media of any clause herein, wherein the processing device further causes the one or more instructions to be presented on a computing device of a user.
38. The computer-readable media of any clause herein, wherein the processing device further executes the one or more instructions using a robot to exchange the one or more first battery cells of the over-aged battery pack candidate with the one or more second battery cells of the under-aged battery pack.
39. The system of any clause herein, wherein the processing device further executes an artificial intelligence recommendation engine to generate the one or more instructions.
40. The system of any clause herein, wherein the processing device employs a battery management policy to reduce battery waste and extend the life of existing batteries.
41. A computer-implemented method comprising:
executing, by an AI engine of a cloud-based computing system, a recommendation generation model configured to generate, based on battery performance metrics, a plurality of recommendations for enhancing battery management strategies of a fleet of vehicles;
receiving, at an edge-based processor, a state of health of a battery pack of a vehicle;
based on the state of health of the battery pack of the vehicle, categorizing a battery
age of the vehicle;
based on a plurality of ambient temperatures, categorizing an ambient temperature of the vehicle;
based on the battery age of the vehicle, the ambient temperature of the vehicle, and the plurality of recommendations, selecting a filtered subset of the plurality of recommendations; and
transmitting the filtered subset.
42. The computer-implemented method of any clause herein, wherein the transmitted filtered subset are presented on a computing device in the vehicle, another computing device remote from the vehicle, or both.
43. The computer-implemented method of any clause herein, further comprising modifying, based on the filtered subset, an operating parameter of the battery pack of the vehicle to charge at an altered rate, consume a different amount of energy, or both.
44. The computer-implemented method of any clause herein, further comprising:
receiving, at the edge-based processor, the plurality of ambient temperatures;
based on the plurality of ambient temperatures, determining an average temperature.
45. The computer-implemented method of any clause herein, wherein the recommendation generation model accounts for a current state of the vehicle to suggest actions to improve battery health.
46. The computer-implemented method of any clause herein, wherein categories associated with battery age comprise fresh, middle-aged, and aged.
47. The computer-implemented method of any clause herein, wherein categories associated with the ambient temperature comprise cold, warm, and hot.
48. The computer-implemented method of any clause herein, further comprising generating user guidance related to minimum state of charge level, maximum discharge rate, average driving speed, or some combination thereof, and filtering the user guidance.
49. A system comprising:
a memory device storing instructions; and
a processing device communicatively coupled to the memory device, wherein the processing device executes the instructions to:
execute, by an AI engine of a cloud-based computing system, a recommendation generation model configured to generate, based on battery performance metrics, a plurality of recommendations for enhancing battery management strategies of a fleet of vehicles;

receive, at an edge-based processor, a state of health of a battery pack of a vehicle;

based on the state of health of the battery pack of the vehicle, categorize a battery age of the vehicle;

based on a plurality of ambient temperatures, categorize an ambient temperature of the vehicle;

based on the battery age of the vehicle, the ambient temperature of the vehicle, and the plurality of recommendations, select a filtered subset of the plurality of recommendations; and transmit the filtered subset.

50. The system of any clause herein, wherein the transmitted filtered subset are presented on a computing device in the vehicle, another computing device remote from the vehicle, or both.

51. The system of any clause herein herein the processing device further modifies, based on the filtered subset, an operating parameter of the battery pack of the vehicle to charge at an altered rate, consume a different amount of energy, or both.

52. The system of any preceding clause, wherein the processing device further: receives, at the edge-based processor, the plurality of ambient temperatures;

based on the plurality of ambient temperatures, determines an average temperature.

53. The system of any clause herein, wherein the recommendation generation model accounts for a current state of the vehicle to suggest actions to improve battery health.

54. The system of any clause herein, further comprising generating a lookup table that establishes a relationship between discharge rate and speed for a group of vehicles to provide user guidance regarding implications discharge rates for each speed.

55. The system of any clause herein, wherein categories associated with the ambient temperature comprise cold, warm, and hot.

56. The system of any clause herein, wherein the processing device further generates user guidance related to minimum state of charge level, maximum discharge rate, average driving speed, or some combination thereof, and filtering the user guidance.

57. A tangible, non-transitory computer-readable media storing instructions that, when executed, cause a processing device to:

execute, by an AI engine of a cloud-based computing system, a recommendation generation model configured to generate, based on battery performance metrics, a plurality of recommendations for enhancing battery management strategies of a fleet of vehicles;

receive, at an edge-based processor, a state of health of a battery pack of a vehicle;

based on the state of health of the battery pack of the vehicle, categorize a battery age of the vehicle;

based on a plurality of ambient temperatures, categorize an ambient temperature of the vehicle;

based on the battery age of the vehicle, the ambient temperature of the vehicle, and the plurality of recommendations, select a filtered subset of the plurality of recommendations; and transmit the filtered subset.

58. The computer-readable media of any clause herein, wherein the transmitted filtered subset are presented on a computing device in the vehicle, another computing device remote from the vehicle, or both.

59. The computer-readable media of any clause herein, wherein the processing device further modifies, based on the filtered subset, an operating parameter of the battery pack of the vehicle to charge at an altered rate, consume a different amount of energy, or both.

60. The computer-readable media of any clause herein, wherein the processing device further:

receives, at the edge-based processor, the plurality of ambient temperatures;

based on the plurality of ambient temperatures, determines an average temperature.

61. A computer-implemented method comprising:

generating, using an artificial intelligence (AI) recommendation generation engine, one or more recommendations to modify an aspect of a battery's health;

transmitting the one or more recommendations to a battery model and a neural remaining useful life model representing an environment;

based on at least the one or more recommendations, receiving, from the battery model, a performance related reward associated with the one or more recommendations impact on degradation rate, cycle life, energy efficiency, or some combination thereof;

based on at least the one or more recommendations, receiving, from the neural remaining useful life model, a battery life related reward associated with long-term impact of the one or more recommendations on battery lifespan; and based on the performance related reward and the battery life related reward, modifying one or more hyperparameters of the AI recommendation generation engine.

62. The computer-implemented method of any clause herein, further comprising using a behavior sampler to generate diverse mission profiles, wherein each of the mission profiles represent different operational scenarios.

63. The computer-implemented method of any clause herein, further comprising, for each of the mission profiles, initializing a state of the battery at a random aging point.

64. The computer-implemented method of any clause herein, further comprising simulating the battery's operation based on a training policy, and determine which rewards are received from the neural remaining useful life model and the battery model.

65. The computer-implemented method of any clause herein, further comprising continuing simulating the battery's operation based on the training policy until an end of life state is reached based on modeling.

66. The computer-implemented method of any clause herein, further comprising reiterating sampling of new missions and training cycles.

67. The computer-implemented method of any clause herein, further comprising continuously monitoring performance metrics and battery life metrics and adjusting hyperparameters as desired.

68. A system comprising:

a memory device storing instructions; and a processing device communicatively coupled to the memory device, wherein the processing device executes the instructions to:

generate, using an artificial intelligence (AI) recommendation generation engine, one or more recommendations to modify an aspect of a battery's health;

transmit the one or more recommendations to a battery model and a neural remaining useful life model representing an environment;
based on at least the one or more recommendations, receive, from the battery model, a performance related reward associated with the one or more recommendations impact on degradation rate, cycle life, energy efficiency, or some combination thereof;
based on at least the one or more recommendations, receive, from the neural remaining useful life model, a battery life related reward associated with long-term impact of the one or more recommendations on battery lifespan; and
based on the performance related reward and the battery life related reward, modify one or more hyperparameters of the AI recommendation generation engine.

69. The system of any clause herein, wherein the processing device uses a behavior sampler to generate diverse mission profiles, wherein each of the mission profiles represent different operational scenarios.

70. The system of any clause herein, wherein the processing device, for each of the mission profiles, initializing a state of the battery at a random aging point.

71. The system of any clause herein, wherein the processing device further simulates the battery's operation based on a training policy, and determine which rewards are received from the neural remaining useful life model and the battery model.

72. The system of any preceding clause, wherein the processing device further continues simulating the battery's operation based on the training policy until an end of life state is reached based on modeling.

74. The system of any clause herein, wherein the processing device reiterates sampling of new missions and training cycles.

75. The system of any clause herein, further comprising continuously monitoring performance metrics and battery life metrics and adjusting hyperparameters as desired.

76. A tangible, non-transitory computer-readable media storing instructions that, when executed, cause a processing device to:
generate, using an artificial intelligence (AI) recommendation generation engine, one or more recommendations to modify an aspect of a battery's health;
transmit the one or more recommendations to a battery model and a neural remaining useful life model representing an environment;
based on at least the one or more recommendations, receive, from the battery model, a performance related reward associated with the one or more recommendations impact on degradation rate, cycle life, energy efficiency, or some combination thereof;
based on at least the one or more recommendations, receive, from the neural remaining useful life model, a battery life related reward associated with long-term impact of the one or more recommendations on battery lifespan; and
based on the performance related reward and the battery life related reward, modify one or more hyperparameters of the AI recommendation generation engine.

77. The computer-readable media of any clause herein, wherein the processing device uses a behavior sampler to generate diverse mission profiles, wherein each of the mission profiles represent different operational scenarios.

78. The computer-readable media of any clause herein, wherein the processing device, for each of the mission profiles, initializing a state of the battery at a random aging point.

79. The computer-readable media of any clause herein, wherein the processing device further simulates the battery's operation based on a training policy, and determine which rewards are received from the neural remaining useful life model and the battery model.

80. The computer-readable media of any clause herein, wherein the processing device further continues simulating the battery's operation based on the training policy until an end of life state is reached based on modeling.

What is claimed is:

1. A computer-implemented method for executing an artificial intelligence (AI) engine, comprising:
executing, by the AI engine, a categorization model configured to categorize, into a plurality of categories, a plurality of vehicles based on a plurality of factors comprising age, temperature conditions, usage patterns, battery health metrics, or some combination thereof;
executing, by the AI engine, a behavior analysis model configured to analyze behavior of the plurality of vehicles in each of the plurality of categories to identify battery performance metrics comprising charging habits, discharge rates, charge rates, state of charge, state of health, state of power, or some combination thereof;
executing, by the AI engine, a recommendation generation model configured to generate, based on the battery performance metrics, one or more recommendations for enhancing battery management strategies, wherein the recommendation generation model accounts for a current state of a vehicle to suggest actions to improve battery health;
executing, by the AI engine, a battery model configured to determine power and energy consumption based on the one or more recommendations generated by the recommendation generation model;
executing a reinforcement learning agent that uses a reward or penalty signal associated with both a neural remaining useful life model and the battery model to generate the one or more recommendations to prolong battery life and improve battery performance; and
executing, using a charge control unit, at least one of the one or more recommendations to control operation of at least one battery pack of the vehicle.

2. The computer-implemented method of claim 1, further comprising using the behavior analysis model to determine an average behavior for each of the plurality of categories.

3. The computer-implemented method of claim 1, wherein the one or more recommendations comprise a minimum state of charge level, a maximum discharge rate, a maximum charge rate, a recommended upper limit for state of charge, or some combination thereof.

4. The computer-implemented method of claim 1, wherein the recommendation generation model generates the one or more recommendations for enhancing battery management strategies without decreasing power or energy capabilities of batteries.

5. The computer-implemented method of claim 1, further comprising:
executing, by the AI engine, a behavior converter configured to receive the one or more recommendations from the recommendation generation model and convert the one or more recommendations into a battery usage pattern that is applied to a battery model and a neural remaining useful life model.

6. The computer-implemented method of claim 1, further comprising:
executing, by the AI engine, a behavior sampler configured to generate a plurality of mission profiles including different training scenarios by simulating different types of user behaviors and environmental conditions.

7. The computer-implemented method of claim 1, wherein the recommendation generation model receives a reward signal from the neural remaining useful life model, wherein the reward signal indicates how well the one or more recommendations generated by the recommendation generation engine align with a desired goal.

8. The computer-implemented method of claim 1, further comprising executing, by the AI engine, the one or more recommendations to modify an operating parameter of a battery pack of the vehicle or influencing driver on his driver habits.

9. The computer-implemented method of claim 1, wherein the recommendation generation model generates the one or more recommendations based on two categories, a first category relates to recommendations related to charging, and a second category relates to user guidance related to driver behavior.

10. A system comprising:
a memory device storing instructions; and
a processing device communicatively coupled to the memory device, wherein the processing device executes the instructions to:
 execute, by an artificial intelligence engine, a categorization model configured to categorize, into a plurality of categories, a plurality of vehicles based on a plurality of factors comprising age, temperature conditions, usage patterns, battery health metrics, or some combination thereof;
 execute, by the AI engine, a behavior analysis model configured to analyze behavior of the plurality of vehicles in each of the plurality of categories to identify battery performance metrics comprising charging habits, discharge rates, charge rates, state of charge, state of health, state of power, or some combination thereof;
 execute, by the AI engine, a recommendation generation model configured to generate, based on the battery performance metrics, a plurality of recommendations for enhancing battery management strategies, wherein the recommendation generation model accounts for a current state of a vehicle to suggest actions to improve battery health;
 execute, by the AI engine, a battery model configured to determine power and energy consumption based on the one or more recommendations generated by the recommendation generation model;
 execute a reinforcement learning agent that uses a reward or penalty signal associated with both a neural remaining useful life model and the battery model to generate the one or more recommendations to prolong battery life and improve battery performance; and
 execute, using a charge control unit, at least one of the one or more recommendations to control operation of at least one battery pack of the vehicle.

11. The system of claim 10, wherein the processing device is further to use the behavior analysis model to determine an average behavior for each of the plurality of categories.

12. The system of claim 10, wherein the one or more recommendations comprise a minimum state of charge level, a maximum discharge rate, a maximum charge rate, a recommended upper limit for state of charge, or some combination thereof.

13. The system of claim 10, wherein the recommendation generation model generates the plurality of recommendations for enhancing battery management strategies without decreasing power or energy capabilities of batteries.

14. The system of claim 10, wherein the processing device further:
executes, by the AI engine, a behavior converter configured to receive the one or more recommendations from the recommendation generation model and convert the one or more recommendations into a battery usage pattern that is applied to a battery model and a neural remaining useful life model.

15. The system of claim 10, wherein the processing device further:
executes, by the AI engine, a behavior sampler configured to generate a plurality of mission profiles including different training scenarios by simulating different types of user behaviors and environmental conditions.

16. The system of claim 10, wherein the recommendation generation engine receives a reward signal from the neural remaining useful life model, wherein the reward signal indicates how well the one or more recommendations generated by the recommendation generation model align with a desired goal.

17. The system of claim 10, wherein the processing device further executes, by the AI engine, the one or more recommendations to modify an operating parameter of a battery pack of the vehicle or influencing driver on his driver habits.

18. The system of claim 10, wherein the recommendation generation model generates the one or more recommendations based on two categories, a first category relates to recommendations related to charging, and a second category relates to user guidance related to driver behavior.

19. A tangible, non-transitory computer-readable media storing instructions that, when executed, cause a processing device to:
execute, by an artificial intelligence engine, a categorization model configured to categorize, into a plurality of categories, a plurality of vehicles based on a plurality of factors comprising age, temperature conditions, usage patterns, battery health metrics, or some combination thereof;
execute, by the AI engine, a behavior analysis model configured to analyze behavior of the plurality of vehicles in each of the plurality of categories to identify battery performance metrics comprising charging habits, discharge rates, charge rates, state of charge, state of health, state of power, or some combination thereof;
execute, by the AI engine, a recommendation generation model configured to generate, based on the battery performance metrics, a plurality of recommendations for enhancing battery management strategies, wherein the recommendation generation model accounts for a current state of a vehicle to suggest actions to improve battery health;

execute, by the AI engine, a battery model configured to determine power and energy consumption based on the one or more recommendations generated by the recommendation generation model;

execute a reinforcement learning agent that uses a reward or penalty signal associated with both a remaining useful life model and the battery model to generate the one or more recommendations to prolong battery life and improve battery performance; and execute, using a charge control unit, at least one of the one or more recommendations to control operation of at least one battery pack of the vehicle.

20. The computer-readable media of claim 19, wherein the processing device is further to use the behavior analysis model to determine an average behavior for each of the plurality of categories.

* * * * *